US009013083B2

(12) United States Patent
Morita et al.

(10) Patent No.: US 9,013,083 B2
(45) Date of Patent: Apr. 21, 2015

(54) PERMANENT MAGNET TYPE ROTARY ELECTRIC MACHINE

(75) Inventors: Yusuke Morita, Tokyo (JP); Masatsugu Nakano, Tokyo (JP); Sachiko Kawasaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 657 days.

(21) Appl. No.: 12/778,424

(22) Filed: May 12, 2010

(65) Prior Publication Data

US 2010/0295403 A1 Nov. 25, 2010

(30) Foreign Application Priority Data

May 21, 2009 (JP) .................................. 2009-123229
Oct. 21, 2009 (JP) .................................. 2009-242666

(51) Int. Cl.
*H02K 1/06* (2006.01)
*H02K 11/00* (2006.01)
*H02K 21/16* (2006.01)
(Continued)

(52) U.S. Cl.
CPC .............. *H02K 1/146* (2013.01); *H02K 21/16* (2013.01); *H02K 21/14* (2013.01); *H02K 29/06* (2013.01); *H02K 1/223* (2013.01); *H02K 29/12* (2013.01)

(58) Field of Classification Search
CPC ......... H02K 1/06; H02K 1/146; H02K 1/223; H02K 1/16; H02K 1/27; H02K 21/16; H02K 29/12; H02K 29/06
USPC ........... 310/156.23, 156.77, 156.78, 216.044, 310/216.069, 216.71, 216.72, 216.74, 310/254.1; 318/400.32

IPC .............................................. H02K 11/00,1/06
See application file for complete search history.

(56) References Cited

U.S. PATENT DOCUMENTS 2,739,253 A * 3/1956 Plumb ...................... 310/156.77
4,780,635 A * 10/1988 Neumann .............. 310/216.111
(Continued)

FOREIGN PATENT DOCUMENTS

JP 59-80140 5/1984
JP 1-101164 7/1989
(Continued)

OTHER PUBLICATIONS

U.S. Appl. No. 12/994,772, filed Nov. 26, 2010, Nakano, et al.
(Continued)

*Primary Examiner* — John K Kim
(74) *Attorney, Agent, or Firm* — Oblon, McClelland, Maier & Neustadt, L.L.P.

(57) ABSTRACT

Provided is a permanent magnet type motor including: a rotor including a rotor core and a plurality of permanent magnets; a conducting circuit including a first electric conductor extending in an axial direction of the rotor and being disposed between permanent magnets in a circumferential direction of the rotor and a second electric conductor for connecting the first electric conductors electrically; and a stator disposed so as to be opposed to the rotor, including a stator core and an armature winding. A rotation angle is detected by measuring current flowing in the armature winding. The stator core is formed to have a shape in which, a slot pitch is defined by $\rho s = (2 \times \pi \times Rs)/Ns$, where an inner radius of the stator is represented by Rs and a number of slots is represented by Ns, a value Wsn obtained by dividing a slot opening width Ws by the slot pitch $\rho s$ satisfies "$0.08 \leq Wsn$".

7 Claims, 34 Drawing Sheets

(51) Int. Cl.
*H02K 1/14* (2006.01)
*H02K 1/22* (2006.01)
*H02K 29/12* (2006.01)
H02K 21/14 (2006.01)
H02K 29/06 (2006.01)

(56) References Cited

U.S. PATENT DOCUMENTS

| | | | |
|---|---|---|---|
| 4,780,636 A * | 10/1988 | Gandhi et al. | 310/49.23 |
| 5,912,521 A * | 6/1999 | Ray | 310/156.06 |
| 6,104,117 A * | 8/2000 | Nakamura et al. | 310/216.074 |
| 6,876,116 B2 * | 4/2005 | Nakano et al. | 310/156.47 |
| 8,324,768 B2 * | 12/2012 | Nakano et al. | 310/68 B |
| 2001/0048264 A1 * | 12/2001 | Trago et al. | 310/254 |
| 2002/0145352 A1 * | 10/2002 | Kimura et al. | 310/156.45 |
| 2003/0057797 A1 * | 3/2003 | Kaneko et al. | 310/217 |
| 2005/0046296 A1 * | 3/2005 | Nakamura | 310/179 |
| 2005/0212378 A1 * | 9/2005 | Wang et al. | 310/260 |
| 2005/0269982 A1 * | 12/2005 | Coles et al. | 318/254 |
| 2006/0284511 A1 * | 12/2006 | Evon et al. | 310/216 |
| 2006/0290225 A1 * | 12/2006 | Mipo et al. | 310/187 |
| 2008/0001571 A1 * | 1/2008 | Tomigashi | 318/721 |
| 2008/0012445 A1 * | 1/2008 | Abe et al. | 310/217 |
| 2008/0203846 A1 * | 8/2008 | Hoemann et al. | 310/216 |
| 2009/0184598 A1 * | 7/2009 | Nakano et al. | 310/156.78 |
| 2009/0200885 A1 * | 8/2009 | Kikuchi et al. | 310/156.78 |
| 2010/0295403 A1 * | 11/2010 | Morita et al. | 310/156.78 |

FOREIGN PATENT DOCUMENTS

| | | |
|---|---|---|
| JP | 6-133513 | 5/1994 |
| JP | 9-117081 | 5/1997 |
| JP | 2001-157428 | 6/2001 |
| JP | 2002-171798 | 6/2002 |
| JP | 2003-319576 | 11/2003 |
| JP | 2004-153886 | 5/2004 |
| JP | 2006-230116 | 8/2006 |
| JP | 2009-027849 | 2/2009 |

OTHER PUBLICATIONS

Japanese Office Action mailed Feb. 12, 2013 in counterpart Japanese application 2009-242666, with an English translation.

* cited by examiner

| ITEM | |
|---|---|
| STATOR INNER RADIUS [mm] | 20.6 |
| STATOR OUTER RADIUS [mm] | 40.0 |
| TEETH HEIGHT [mm] | 10.0 |
| TEETH WIDTH [mm] | 7.0 |
| SLOT OPENING WIDTH [mm] | 0.9 |
| GAP LENGTH [mm] | 0.6 |
| AXIAL LENGTH [mm] | 35.0 |
| RATING AMPERE-TURN [AT] | 1264 |

FIG. 9

PERMANENT MAGNET TYPE ROTARY ELECTRIC MACHINE

BACKGROUND OF THE INVENTION

1. Field of the Invention

The present invention relates to a permanent magnet type rotary electric machine. In particular, the present invention relates to a motor structure for improving saliency, a motor structure for reducing angle error in sensorless drive, and an electric power steering apparatus to which a permanent magnet type rotary electric machine can be applied.

2. Description of the Related Art

In order to drive a synchronous motor such as a permanent magnet type motor, it is necessary to perform position sensing using a rotary sensor or the like. On the other hand, there are developed sensorless drive methods for driving the motor without using a rotary sensor so as to reduce cost of the motor or size of the same. One of the methods is the high-frequency voltage injection method in which a high frequency voltage is applied to an armature winding of the motor in addition to a voltage for generating a torque, and position sensing of a rotor is performed by utilizing a difference between d-axis current and q-axis current due to dependency of motor impedance on a rotor position (i.e., saliency). However, this method requires the saliency. An interior permanent magnet motor has the saliency, and thus can be used for the sensorless drive (see, for example, Japanese Patent Application Laid-Open No. 2004-056871 and Japanese Patent Application Laid-Open No. 2004-350380).

However, the conventional technique has the following problems.

The conventional technique has a problem in that the rotor has a larger cogging torque because of an interior permanent magnet motor compared with a surface permanent magnet motor. In addition, there is another problem that because the angle error of the position sensing in the sensorless drive varies in accordance with motor load current, the torque may be lowered, or "step out" or the like may occur. In addition, the saliency is small, and hence it is necessary to increase the high frequency current for the position sensing in the sensorless drive, which causes a problem of large noise and a further problem that the saliency varies in accordance with the load current.

SUMMARY OF THE INVENTION

The present invention has been made in order to solve the above-mentioned problems, and therefore has an object to reduce angle error of position sensing in sensorless drive and dependency of the angle error on a load current and, in addition, to improve saliency necessary for the position sensing, thereby obtaining a permanent magnet type rotary electric machine that is suitable for the sensorless drive.

According to the present invention, a permanent magnet type rotary electric machine comprises: a rotor including a rotor core and a plurality of permanent magnets; one or more conducting circuits each including a first electric conductor extending in an axial direction of the rotor and being disposed between at least two permanent magnets in a circumferential direction of the rotor, and a second electric conductor for connecting the first electric conductors electrically, the one or more conducting circuits being disposed at one or more positions in the circumferential direction of the rotor; and a stator disposed so as to be opposed to the rotor, the stator including a stator core and armature windings, the permanent magnet type rotary electric machine detecting a rotation angle by measuring current flowing in the armature windings, wherein the stator core is formed so as to have a shape in which, when a slot pitch ρs is defined by $\rho s=(2\times\pi\times Rs)/Ns$, where an inner radius of the stator is represented by Rs (mm) and a number of slots is represented by Ns, a value Wsn obtained by dividing a slot opening width Ws (mm) by the slot pitch ρs (i.e., Wsn=Ws/ρs) satisfies the following equation: $0.08 \leq Wsn$.

Further, according to the present invention, a permanent magnet type rotary electric machine comprises: a rotor including a rotor core and a plurality of permanent magnets; one or more conducting circuits each including a first electric conductor extending in an axial direction of the rotor and being disposed between at least two permanent magnets in a circumferential direction of the rotor, and a second electric conductor for connecting the first electric conductors electrically, the one or more conducting circuits being disposed at one or more positions in the circumferential direction of the rotor; and a stator disposed so as to be opposed to the rotor, the stator including a stator core and an armature winding, the permanent magnet type rotary electric machine detecting a rotation angle by measuring current flowing in the armature winding, wherein the stator core is formed so as to have a shape in which, when a slot pitch ρs is defined by $\rho s=(2\times\pi\times Rs)/Ns$, where an inner radius of the stator is represented by Rs (mm) and a number of slots is represented by Ns, a value Wtn obtained by dividing a teeth width Wt (mm) by the slot pitch ρs (i.e., Wtn=Wt/ρs) satisfies the following equation: $0.67 \leq Wtn \leq 0.92$.

According to the present invention, one or more conducting circuits made of an electric conductor are provided to the rotor, and a shape of the stator core is specified so that a slot opening width or a teeth width has a value within a predetermined range, whereby the angle error of the position sensing in the sensorless drive and the dependency of the angle error on the load current can be reduced. In addition, the saliency necessary for the position sensing can be improved. Thus, it is possible to obtain the permanent magnet type rotary electric machine that is suitable for the sensorless drive.

BRIEF DESCRIPTION OF THE DRAWINGS

In the accompanying drawings:

FIG. 9 is a list of motor specifications according to Embodiment 1 of the present invention;

DETAILED DESCRIPTION OF THE PREFERRED EMBODIMENTS

Now, preferred embodiments of a permanent magnet type rotary electric machine according to the present invention are described with reference to the attached drawings.

Embodiment 1

First, a principle for improving saliency by a structure of a rotor is described.

Embodiment 1 describes the case where a rotor of the permanent magnet type motor (permanent magnet type rotary electric machine) is provided with one or more induced current circuit (conducting circuit) made of one or more electric conductor and a rotation angle of the rotor is sensed without a rotary sensor. Such the electric conductor is made of copper or aluminum, for example.

Figure 1:
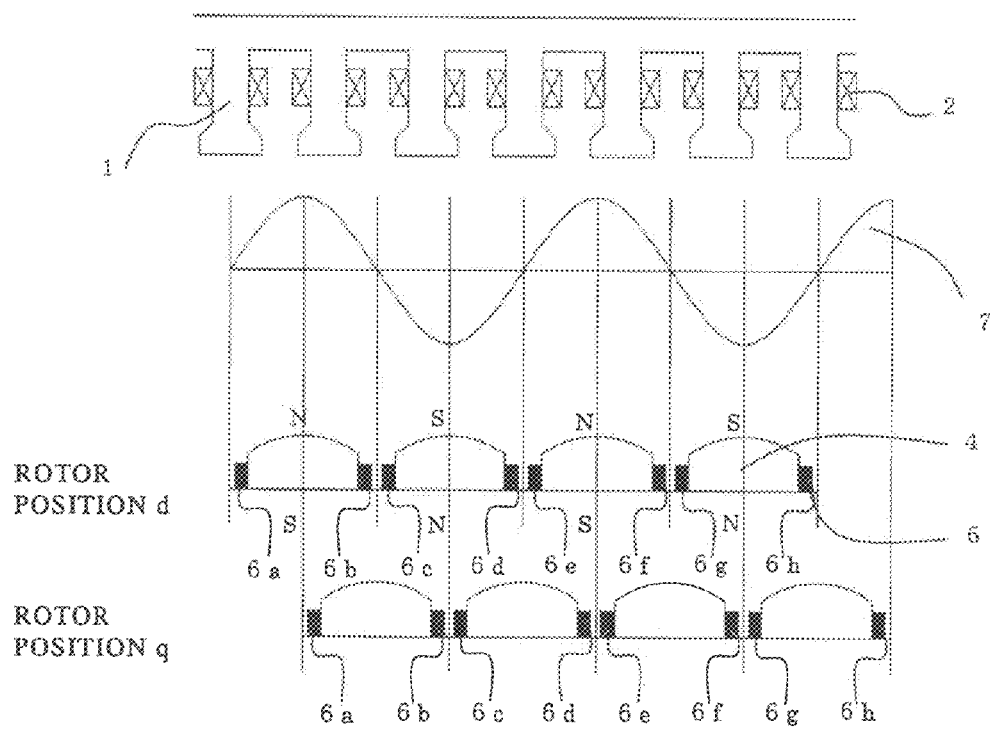
FIG. 1 is an explanatory diagram of a principle for induced current flowing in a permanent magnet type rotary electric machine according to Embodiment 1 of the present invention.

In the first place, a principle for enabling to sense a rotation angle without a rotary sensor is described. FIG. 1 is an explanatory diagram of a principle for induced current flowing in the permanent magnet type rotary electric machine according to Embodiment 1 of the present invention. For easy understanding, FIG. 1 illustrates the cross section of the permanent magnet type rotary electric machine in a linear manner, in which two rotor positions d and q are illustrated.

An ordinary permanent magnet type motor is constituted of a stator including a stator core 1 and armature windings 2, and a rotor including a rotor core 3 and permanent magnets 4, while the components illustrated in FIG. 1 are extended in parallel or substantially in parallel to the rotation axis direction. Actually, this motor illustrated in FIG. 1 is provided with an electric conductor 6 disposed at a perimeter between the permanent magnets. FIG. 1 illustrates the motor having four poles, but the number of poles and the number of slots are not limited to this structure. In addition, "N" and "S" in FIG. 1 denote polarities of the permanent magnets.

Figure 2:
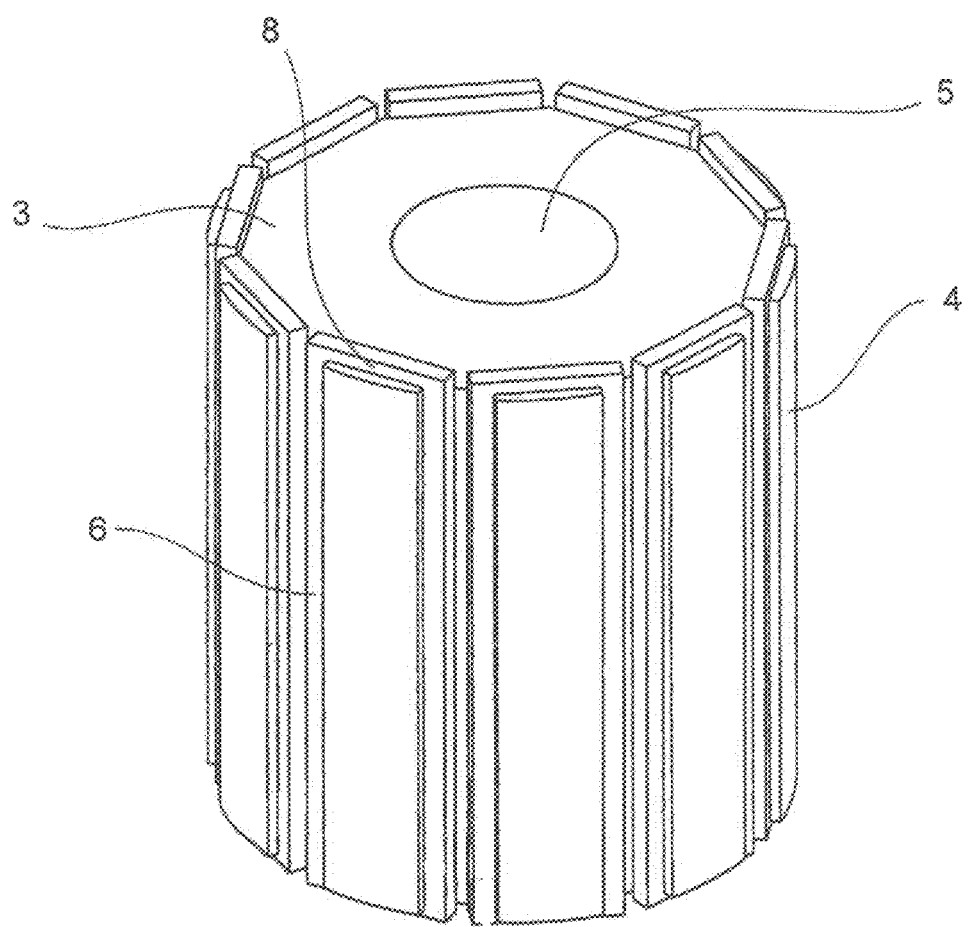
FIG. 2 is a perspective view of a rotor of a motor according to Embodiment 1 of the present invention.

FIG. 2 is a perspective view of the rotor of the motor according to Embodiment 1 of the present invention and is a diagram illustrating a structural example in a case of the rotor having 10 poles corresponding to FIG. 1. As illustrated in FIG. 2, the electric conductor 6 (corresponding to a first electric conductor) and an electric conductor 8 (corresponding to a second electric conductor) are disposed at the periphery of the permanent magnet 4. Here, the electric conductor 6 and the electric conductor 8 make a closed circuit, and thus correspond to the conducting circuit. In the following embodiments too, the electric conductor 6 and the electric conductor 8 constitute the conducting circuit similarly.

A rotation angle is sensed by using saliency. Here, the saliency means dependency of impedance on a rotor position. In addition, the impedance mentioned here means impedance between two arbitrary terminals among individual phase terminals of the armature windings, for example. Such the impedance is simply referred to as "impedance" in the following description. The electric conductor 6 and the electric conductor 8 are disposed at the perimeter of the permanent magnet 4 and the motor includes the conducting circuit, whereby it is possible to increase the saliency when a high frequency voltage is applied to the motor, so as to enable sensorless drive of the motor.

With reference to FIG. 1 again, the rotor positions d and q are compared, between which an impedance difference becomes largest. The waveform illustrated in FIG. 1 illustrates magnetic flux 7 that is generated by armature current when the high frequency voltage is applied. However, for simplification, only a fundamental wave component is illustrated.

First, in a case of the rotor position d, the magnetic flux 7 generated by the armature current makes linkage between 6a and 6b, for example, and induced current flows in the electric conductor 6. The induced current cancels the magnetic flux generated by the armature current, with the result that the impedance is decreased.

On the other hand, in a case of the rotor position q, components of the magnetic flux 7 generated by the armature current, which make linkage between 6a and 6b, are cancelled with each other. Therefore, no induced current flows in the electric conductor so that no change occurs in the impedance. In this way, utilizing the phenomenon of occurrence of the impedance difference in accordance with the rotor position, the position sensing of the rotor can be performed.

Figure 3:
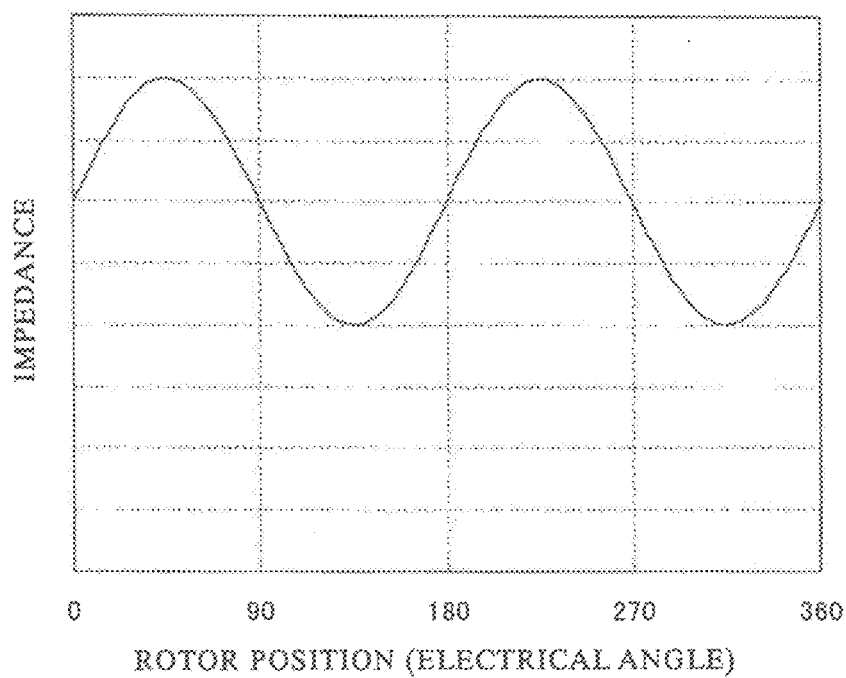
FIG. 3 is a graph illustrating a relationship between a rotation angle of the rotor and impedance in Embodiment 1 of the present invention.

FIG. 3 is a graph illustrating a relationship between the rotation angle of the rotor and the impedance in Embodiment 1 of the present invention and illustrates the saliency. In FIG. 3, the horizontal axis represents a rotation angle (electrical angle) of the rotor, and the vertical axis represents the impedance. In FIG. 3, the period in which the impedance changes is 180 degrees of the electrical angle. This is possible because the center of the two electric conductors disposed between the permanent magnets is positioned at the center between magnetic poles of the neighboring permanent magnet 4.

Figure 4:
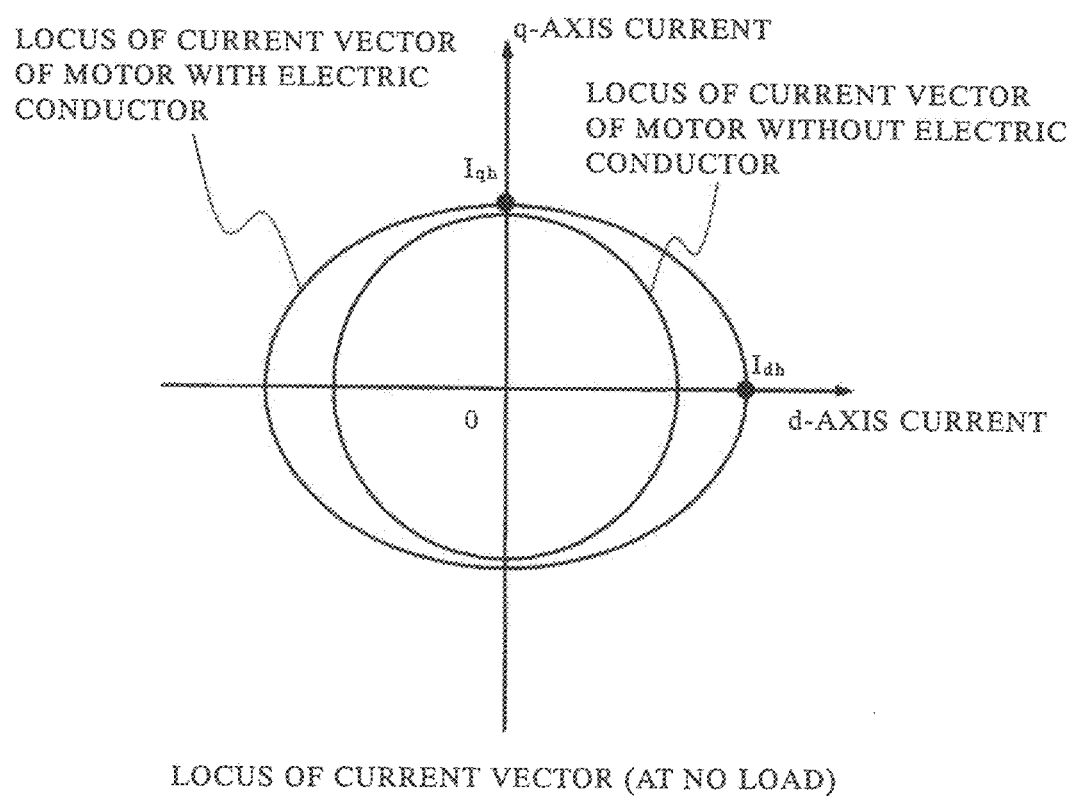
FIG. 4 is a graph illustrating a locus of a current vector obtained by dq conversion of current flowing in an armature winding when a high frequency voltage is applied at no load in Embodiment 1 of the present invention.
Figure 5:
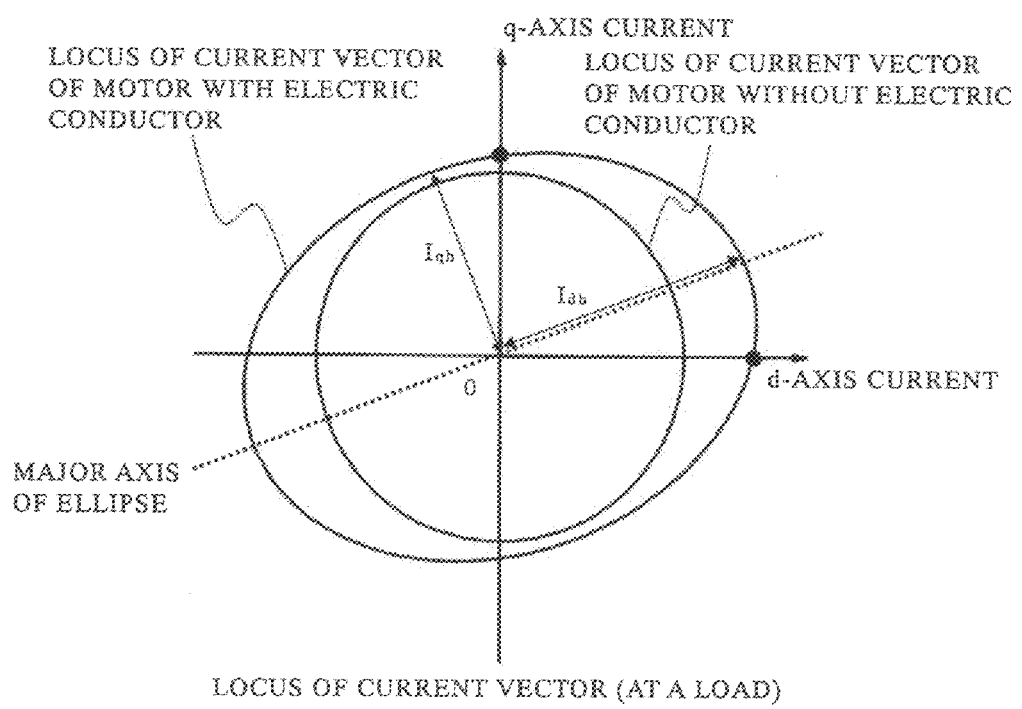
FIG. 5 is a graph illustrating a locus of a current vector obtained by dq conversion of current flowing in an armature winding when a high frequency voltage is applied at a load in Embodiment 1 of the present invention.

FIG. 4 is a graph illustrating a locus of a current vector obtained by dq conversion of current flowing in an armature winding when a high frequency voltage is applied at no load in Embodiment 1 of the present invention. On the other hand, FIG. 5 is a graph illustrating a locus of a current vector obtained by dq conversion of current flowing in an armature winding when a high frequency voltage is applied at a load in Embodiment 1 of the present invention. In FIGS. 4 and 5, the horizontal axis represents the d-axis current, and the vertical axis represents the q-axis current. The motor is a three phase motor having a U-phase, a V-phase and a W-phase, and the high frequency voltage to be applied includes line voltage having the same amplitude and phases that are shifted by $2\pi/3$ radians each.

A locus of the current vector in an ordinary motor without the electric conductor becomes a perfect circle or an almost perfect circle as illustrated in FIGS. 4 and 5 because the impedances of the d-axis and the q-axis do not depend on the rotor position (i.e., have little saliency).

On the other hand, the locus of the current vector in the motor with the electric conductor becomes an ellipse as illustrated in FIGS. 4 and 5. This is because the disposed electric conductor makes impedances of the d-axis and the q-axis depend on the rotor position so that the current changes. As illustrated in FIGS. 4 and 5, the center of the ellipse meets with the origin of the coordinates, and the major axis of the ellipse meets with the d-axis in FIG. 4. In addition, if magnetic saturation is caused in the stator core 1 at a load, the major axis of the ellipse may be inclined from the d-axis in the positive or the negative direction as illustrated in FIG. 5.

A deviation of the major axis of the ellipse from the d-axis causes an angle error in the position sensing, and hence it is preferable that the deviation should be small. In this case, too, it is possible to perform the position sensing from the load current and the inclination of the major axis direction. Note that the ellipse illustrated in FIG. 5 is plotted by shifting so that the average value of the d-axis current and the average value of the q-axis current at respective points of the ellipse meet with the origin.

The principle for enabling to sense a rotation angle without a rotary sensor is described above, and next, interrelationship between the saliency and accuracy in the sensorless drive is described.

The accuracy of position estimation in the sensorless drive is higher as a difference $\Delta$Ih between d-axis current Idh and q-axis current Iqh when the high frequency voltage is applied is larger. Values of Idh and Iqh correspond respectively to a half of the length of the major axis and to a half of the length of the minor axis of the ellipse as illustrated in FIGS. 4 and 5. $\Delta$Ih can be expressed by the following Equation (1). In addition, to evaluate saliency of the motor, an indicator of saliency is defined by the following Equation (2).

$$\Delta I_h = \frac{V_h}{2\pi f}\left(\frac{1}{L_{dh}} - \frac{1}{L_{qh}}\right) \tag{1}$$

$$\frac{1}{L_{dh}} - \frac{1}{L_{qh}} \tag{2}$$

$\Delta$Ih is proportional to a product of the high frequency voltage, the indicator of saliency (a difference between the inverse of d-axis inductance Ldh and the inverse of q-axis inductance Lqh when the high frequency voltage is applied), and the inverse of a frequency, and hence the high frequency current (or high frequency voltage Vh) can be controlled to be small as the saliency is higher if $\Delta$Ih is the same. On the other hand, noise of the motor is larger as the high frequency current is larger. Therefore, as the saliency is higher, accuracy of the position estimation can be secured by smaller current, and hence the noise can be controlled to be small.

Figure 6:
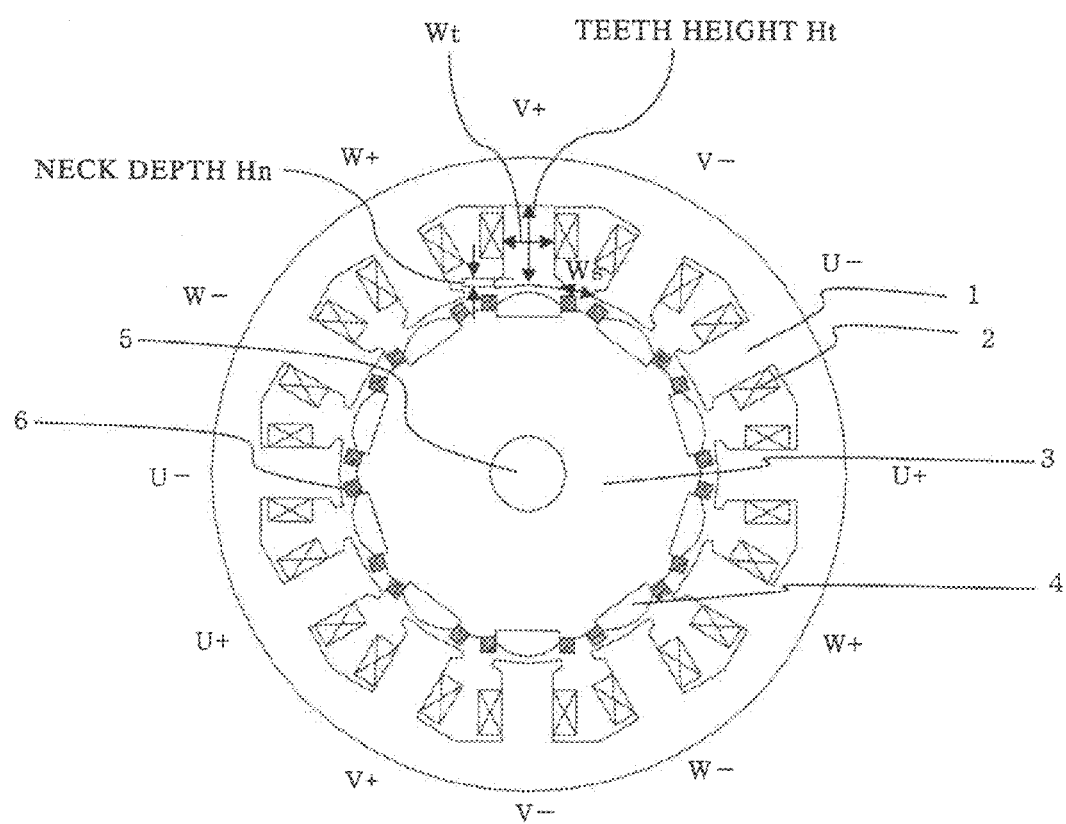
FIG. 6 is a cross section of a surface permanent magnet motor having 10 poles and 12 slots illustrating a first specific example of the permanent magnet type rotary electric machine according to Embodiment 1 of the present invention.

Hereinafter, using specific examples, the permanent magnet type rotary electric machine according to Embodiment 1 is described in detail. FIG. 6 is a cross section of a surface permanent magnet motor having 10 poles and 12 slots illustrating a first specific example of the permanent magnet type rotary electric machine according to Embodiment 1 of the present invention.

In the first specific example, the motor is constituted of a stator including the armature winding 2 and the stator core 1, and a rotor including the permanent magnet 4 and the rotor core 3. Supposing that the rotation direction of the rotor is the counter-clockwise direction, a winding arrangement is U+, U−, V−, V+, W+, W−, U−, U+, V+, V−, W−, and W+ in the counter-clockwise direction. Here, U+ and U− indicate U-phase windings, and "+" and "−" mean that the windings are wound in the opposite directions. The same is true for V and W. The same equation method is used in the following description.

As described above, in the first specific example of the permanent magnet type rotary electric machine of Embodiment 1, the rotor of the motor is provided with the electric conductors 6 and 8 constituting the conducting circuit at the perimeter of the permanent magnet 4. According to this structure, compared with the case of the rotor without the electric conductors 6 and 8, saliency can be improved, and hence the motor becomes suitable for the sensorless drive.

Figure 7:
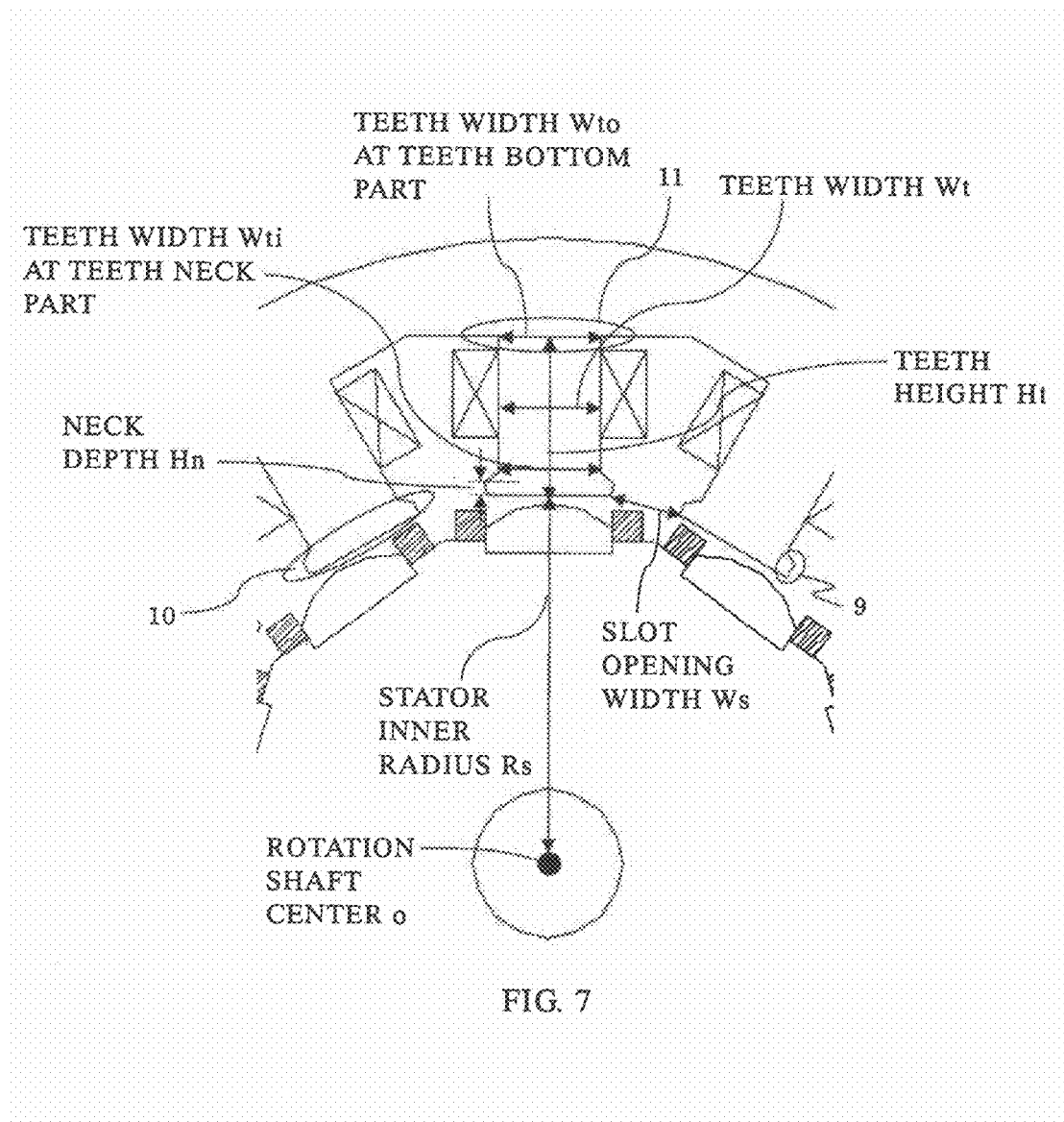
FIG. 7 is a cross section of the motor according to Embodiment 1 of the present invention.

Next, a structure of the stator that is used for the sensorless drive is described. First, dimensions are expressed as follows, which is common to the present invention. FIG. 7 is a cross section of the motor according to Embodiment 1 of the present invention. As illustrated in FIG. 7, the slot opening width is represented by Ws (mm), the inner radius of the stator is represented by Rs (mm), the teeth width is represented by Wt (mm), the teeth width at the teeth bottom part is represented by Wto (mm), the teeth width at the teeth neck part is represented by Wti (mm), and the neck depth is represented by Hn (mm). In addition, when the number of slots is represented by Ns, the slot pitch ρs is expressed by the following Equation (3).

$$\rho s = (2 \times \pi \times Rs)/Ns \qquad (3)$$

In order to restrict values of the slot opening width Ws and the teeth width Wt irrespective of parameters such as an inner diameter of the stator and the number of slots, Wsn is expressed as a value obtained by dividing the slot opening width Ws by the slot pitch ρs (Wsn=Ws/ρs), and Wtn is expressed as a value obtained by dividing the teeth width Wt by the slot pitch ρs (Wtn=Wt/ρs).

The stator that is used for the sensorless drive has the stator core 3 and the armature winding 2 wound on the same, which increases the slot opening width Ws. A size of the slot opening width Ws is described later. Note that the rotor of the first specific example according to Embodiment 1 is used in the above-mentioned description, but other structure may be adopted as long as the rotor has the saliency.

Figure 8:
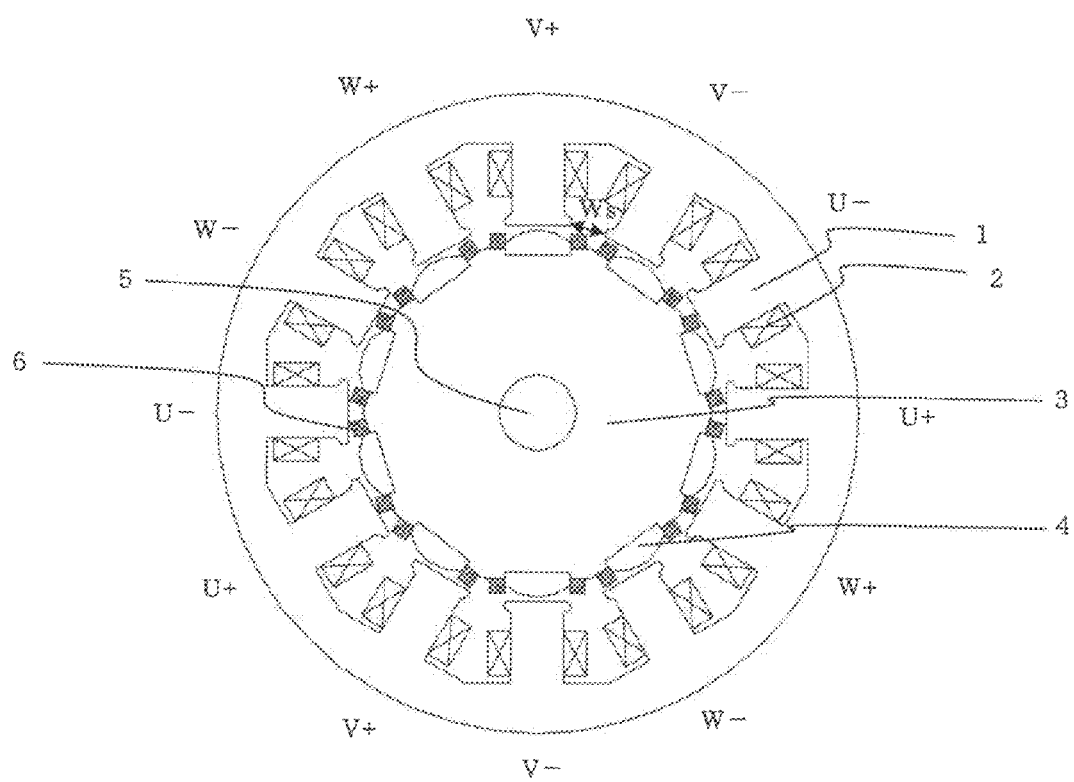
FIG. 8 is a cross section of a motor illustrating a second specific example of the permanent magnet type rotary electric machine according to Embodiment 1 of the present invention.

FIG. 8 is a cross section of a motor illustrating a second specific example of the permanent magnet type rotary electric machine according to Embodiment 1 of the present invention. The stator is constituted of the stator core 1 and the armature winding 2, which increases the slot opening width Ws. If the slot opening width Ws is made to be large, the angle error decreases. A graph showing the basis is described as follows. FIG. 9 is a list of motor specifications in Embodiment 1 of the present invention. In the following description, the teeth width, the slot opening width, and teeth height have values illustrated in FIG. 9, unless otherwise defined.

Figure 10:
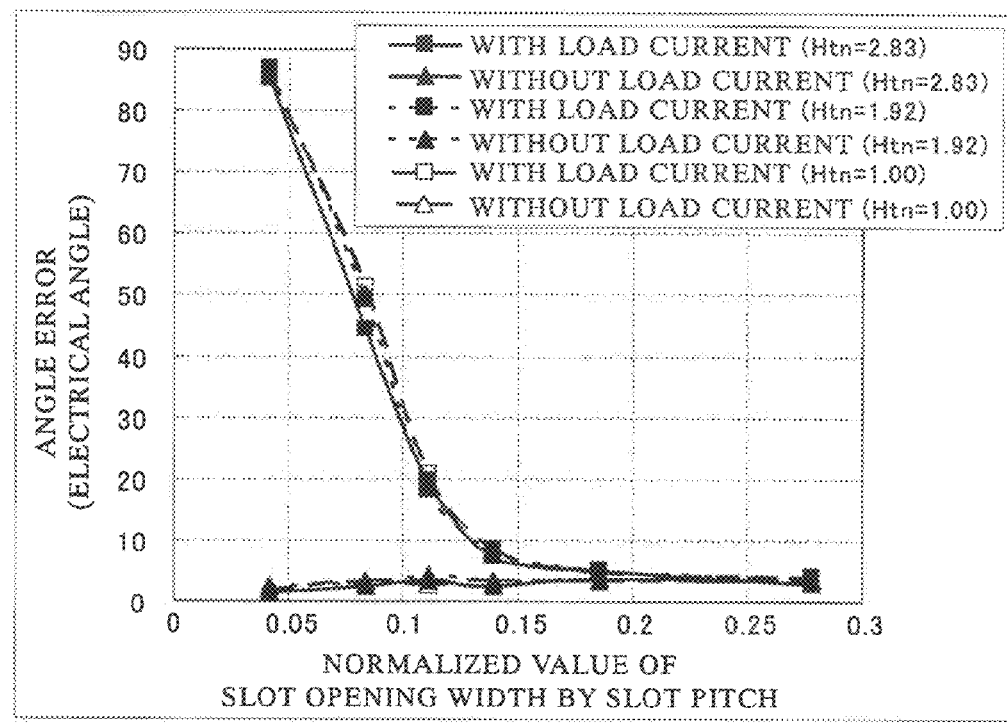
FIG. 10 is a graph illustrating an angle error with a parameter of a slot opening width of the motor having 10 poles and 12 slots (with a fixed teeth width) according to Embodiment 1 of the present invention.

FIG. 10 is a graph illustrating the angle error with a parameter of the slot opening width of the motor having 10 poles and 12 slots (with a fixed teeth width) according to Embodiment 1 of the present invention. The teeth height has three values, and Htn indicates a ratio of the teeth height. The horizontal axis represents a value Wsn obtained by dividing the slot opening width Ws by the slot pitch ρs, and the vertical axis represents the angle error, which is an electrical angle (degrees) of the major axis of the ellipse with respect to the d-axis.

There are two conditions for current. One is with the load current (current for driving the motor) while the other is without the same, and in both of the conditions the high frequency current is injected for the sensorless drive. As illustrated in FIG. 10, irrespective of Htn, without the load current, the angle error does not depend on the slot opening width Ws and is substantially zero. Also in the case with the load current, irrespective of Htn, the angle error depends on the slot opening width Ws and is decreased when the slot opening width Ws increases.

Figure 11:
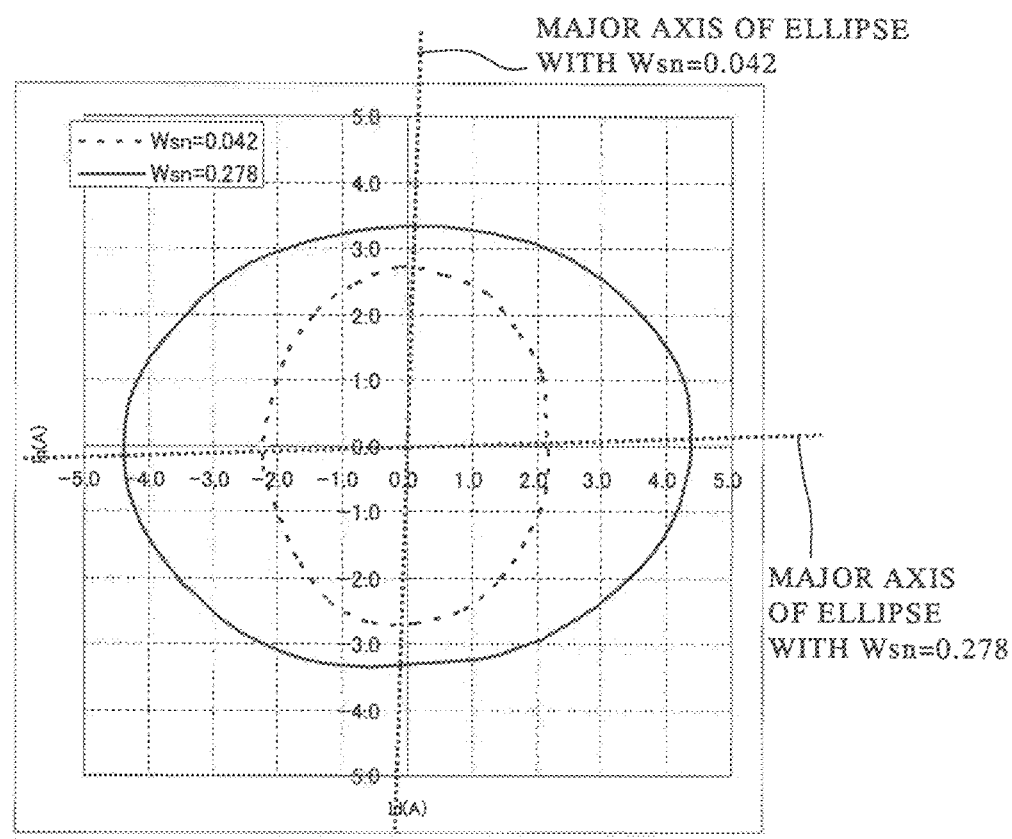
FIG. 11 is a graph illustrating a locus of a current vector obtained by dq conversion of current flowing in an armature winding when a high frequency voltage is applied at a load in Embodiment 1 of the present invention with different slot opening widths.

Here, a change of the angle error (change in the locus of the current vector in the major axis direction) is described more specifically. FIG. 11 is a graph illustrating a locus of a current vector obtained by dq conversion of current flowing in an armature winding when a high frequency voltage is applied at a load in different slot opening widths according to Embodiment 1 of the present invention. As illustrated in FIG. 11, the inclination of the ellipse (an absolute value of the deviation of the major axis of the ellipse from the d-axis) is larger in the case of Wsn=0.042. In other words, it is understood that the angle error decreases when the slot opening width is increased. In addition, the size of the ellipse is larger in the case of Wsn=042. This is considered to be because leakage magnetic flux becomes larger and inductance becomes larger as the slot opening width becomes smaller.

Figure 12:
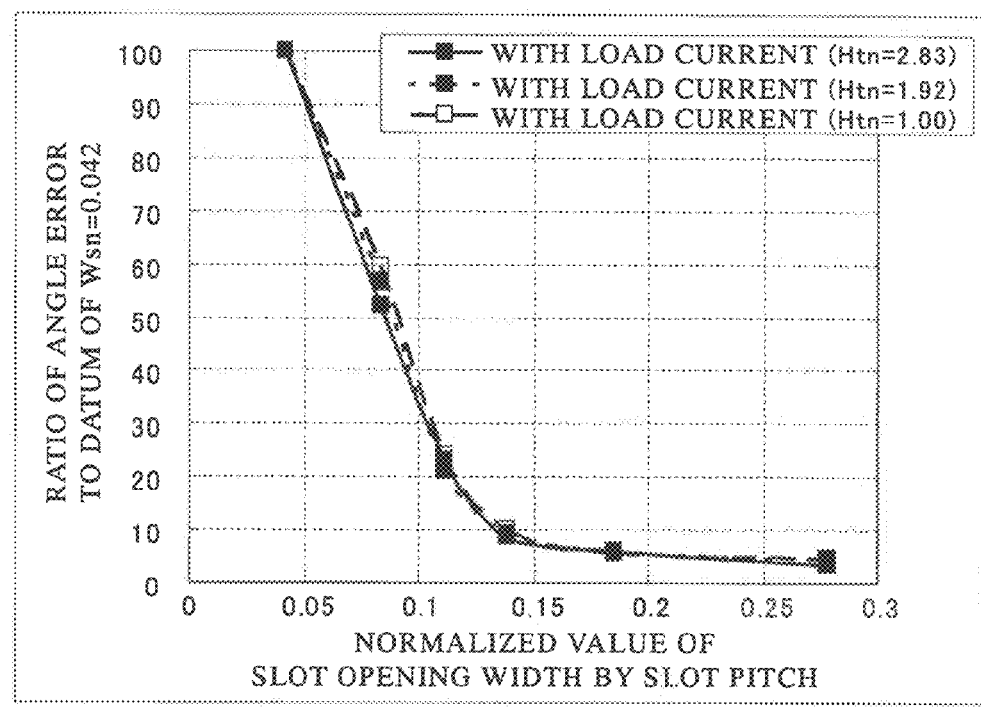
FIG. 12 is a graph illustrating an angle error with a parameter of a slot opening width of the motor having 10 poles and 12 slots (with a fixed teeth width and datum of Wsn=0.042) according to Embodiment 1 of the present invention.

FIG. 12 is a graph illustrating the angle error with a parameter of the slot opening width of the motor having 10 poles and 12 slots (with a fixed teeth width and datum of Wsn=0.042) according to Embodiment 1 of the present invention. The teeth height has three values, and Htn indicates a ratio of the teeth height. The horizontal axis represents a value Wsn obtained by dividing the slot opening width Ws by the slot pitch ρs, and the vertical axis represents a ratio of the angle error to the datum of Wsn=0.042 (the leftmost point in FIG. 12), which is an electrical angle (degrees) of the major axis of the ellipse with respect to the d-axis.

As illustrated in FIG. 12, the ratio of the angle error to the datum of Wsn=0.042 can be reduced to be a half or smaller by satisfying "0.08≤Wsn", preferably. More preferably, by satisfying "0.11≤Wsn", the ratio can be reduced to be 1/5 or smaller. In this way, if the slot opening width is increased, the angle error becomes small. In addition, preferably, if "Wsn≤0.35" is satisfied, it is possible to reduce the problem that a torque is decreased and that a torque ripple is increased because of the magnetic saturation caused when the width of the teeth neck part becomes smaller than the teeth width.

The same tendency is observed in the three values of the teeth height illustrated in FIG. 12, and the interrelationship between the angle error and the slot opening width does not depend on the teeth height Ht. However, "Wsn≤0.35" is satisfied in the case of Wtn=0.65 (a motor shape illustrated in FIG. 12), which is determined from "1-Wtn".

Figure 13:
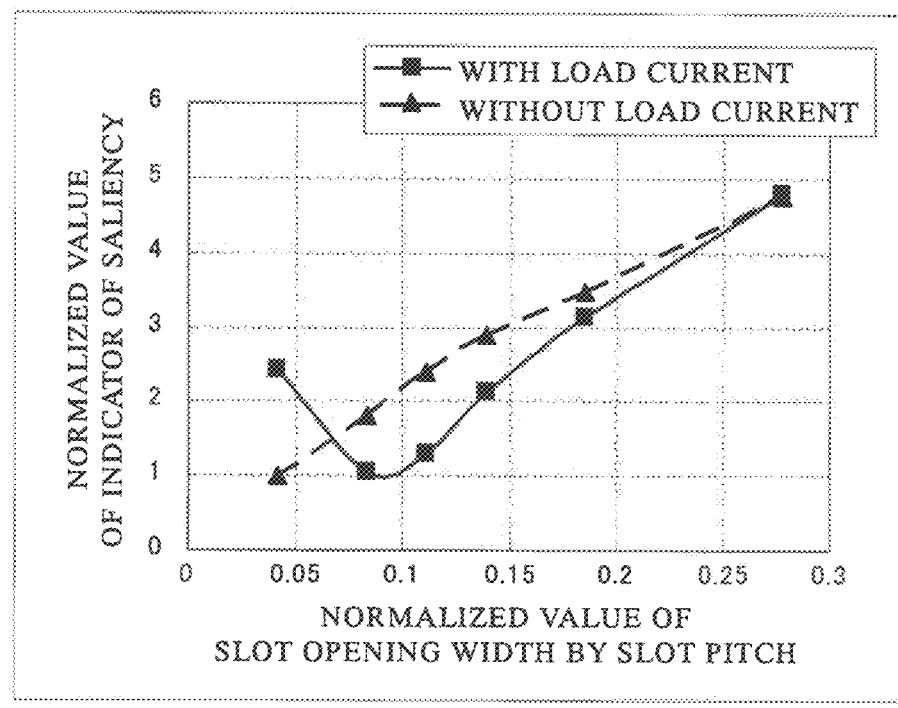
FIG. 13 is a graph illustrating saliency with a parameter of a slot opening width of the motor having 10 poles and 12 slots (with a fixed teeth width) according to Embodiment 1 of the present invention.

In addition, not only the effect of decreasing the angle error but also the effect of improving the saliency can be obtained by increasing the slot opening width. FIG. 13 is a graph illustrating the saliency with a parameter of the slot opening width of the motor having 10 poles and 12 slots (with a fixed teeth width) according to Embodiment 1 of the present invention. The horizontal axis represents a value Wsn obtained by dividing the slot opening width Ws by the slot pitch ρs, and the vertical axis represents a value obtained by normalizing the indicator of saliency at each slot opening width with the indicator of saliency without the load current in a case of the smallest slot opening width (Wsn=0.042).

In this way, if the slot opening width is increased, the saliency is improved. As a result, accuracy of the sensorless drive is enhanced, and hence the high frequency current necessary for the position sensing can be decreased and noise can be reduced.

It is understood from the above-mentioned graphs that if the slot opening width is increased, the effect of decreasing the dependency of the angle error on the load current and decreasing the angle error in the case with the load current can be obtained. Therefore, the second specific example of the permanent magnet type rotary electric machine according to Embodiment 1 can obtain the effect described above, and thus can enhance accuracy of the position sensing compared with the conventional technique. Thus, it is possible to reduce the problems in the conventional technique, which includes the problem such as the torque decrease or the step out that is caused when the angle error of the position sensing in the sensorless drive varies in accordance with the motor load current, or the problem such as noise that is caused when the high frequency current necessary for the position sensing increases because of low accuracy of the sensorless drive.

Here, when a product value of an effective value of line current and the number of turns is referred to as ampere-turn (unit is AT), the above-mentioned effect can be obtained at approximately 0 to 1,264 AT. In addition, the above-mentioned effect can be obtained within the range of 0 to 1,264 AT even if the motor has a rating ampere-turn that is 1,264 AT or larger or the motor may be driven by 1,264 AT or higher.

Note that magnetic saturation at a vicinity of a teeth tip part (a part of teeth that is on the side close to the rotor and is outside the teeth width) is considered to be one of factors that increase the angle error in the shape with a small slot opening width.

Figure 14:
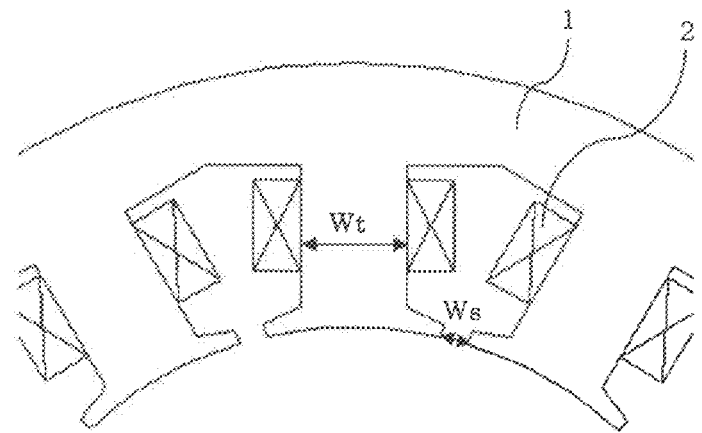
FIG. 14 is an explanatory diagram of a teeth shape according to Embodiment 1 of the present invention.
Figure 15:
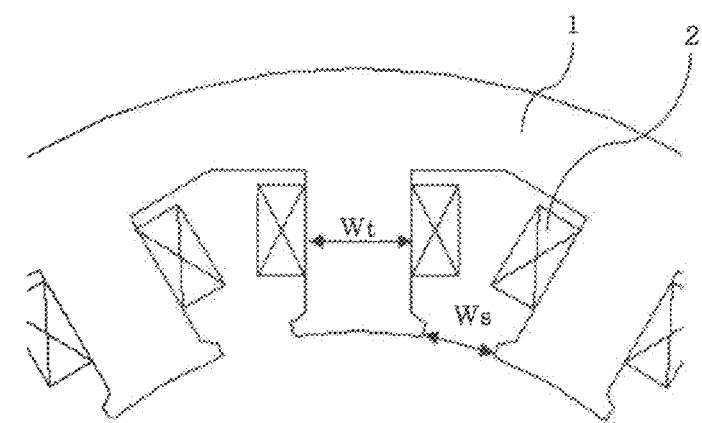
FIG. 15 is an explanatory diagram of a teeth shape according to Embodiment 1 of the present invention.

FIGS. 14 and 15 are explanatory diagrams of a teeth shape according to Embodiment 1 of the present invention. The teeth width is the same in both FIG. 14 and FIG. 15, but the slot opening width is larger in FIG. 15 than in FIG. 14. As illustrated in FIGS. 14 and 15, it is considered that when the slot opening width Ws is increased, the shape of the teeth tip part becomes small because the teeth width is fixed. As a result, leakage magnetic flux between neighboring teeth tip parts is decreased, and magnetic saturation at a vicinity of the teeth tip part can be relieved, resulting in a decrease of the angle error.

Figure 16:
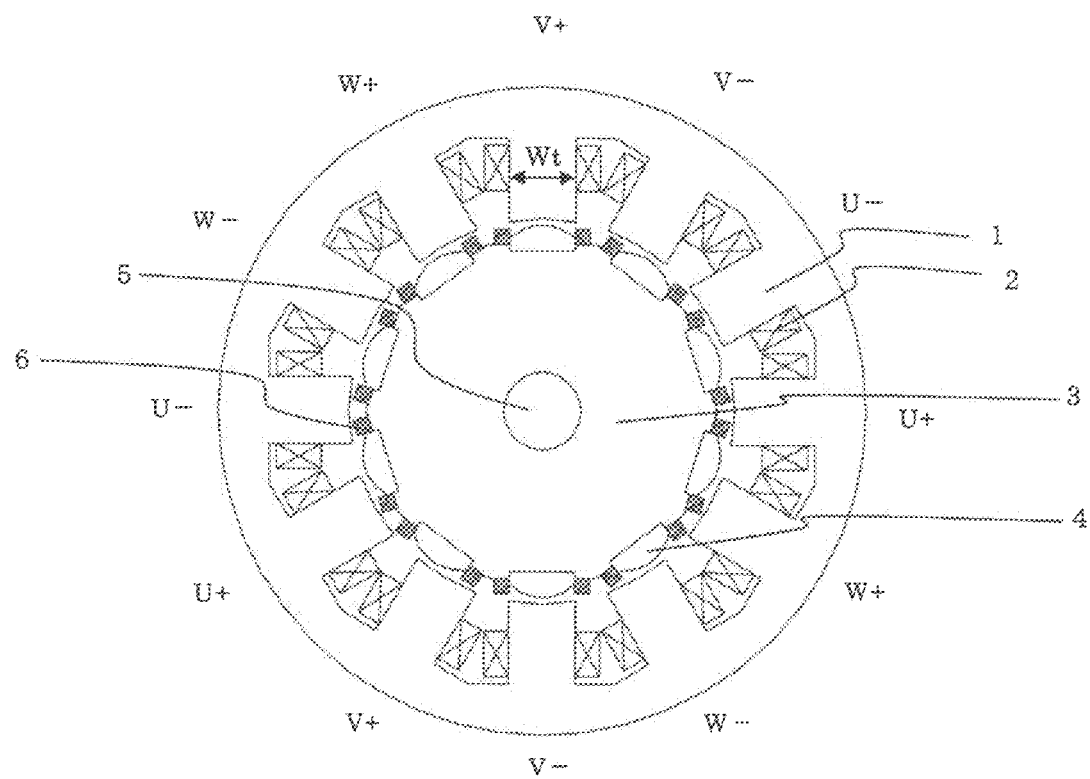
FIG. 16 is a cross section of a motor illustrating a third specific example of the permanent magnet type rotary electric machine according to Embodiment 1 of the present invention.

Next, a third specific example is described. FIG. 16 is a cross section of a motor illustrating the third specific example of the permanent magnet type rotary electric machine according to Embodiment 1 of the present invention. The third specific example includes the rotor that is the same as that used in the first specific example illustrated in FIG. 6, but other structure may be adopted as long as the rotor has the saliency. The stator is constituted of the stator core 1 and the armature winding 2. The tip part of the teeth is eliminated, whereby the slot opening width Ws is larger than that in the case with the tip part.

In this third specific example too, the same effect as the second specific example can be obtained. In addition, the effect of decreasing the angle error is obtained in Embodiment 1 by increasing the slot opening width as described above, and the effect of improving the saliency can also be obtained.

According to this structure, it is possible to decrease the magnetic saturation in the sensorless drive, whereby the angle error due to cross-coupling and dependency of the angle error on the load current can be reduced. Thus, it is possible to prevent the problem such as the torque decrease or the step out due to incorrect position sensing. In addition, the saliency can be improved by this structure, and hence it is not necessary to increase the high frequency current for performing the position sensing in the sensorless drive, and noise can be suppressed.

Figure 17:
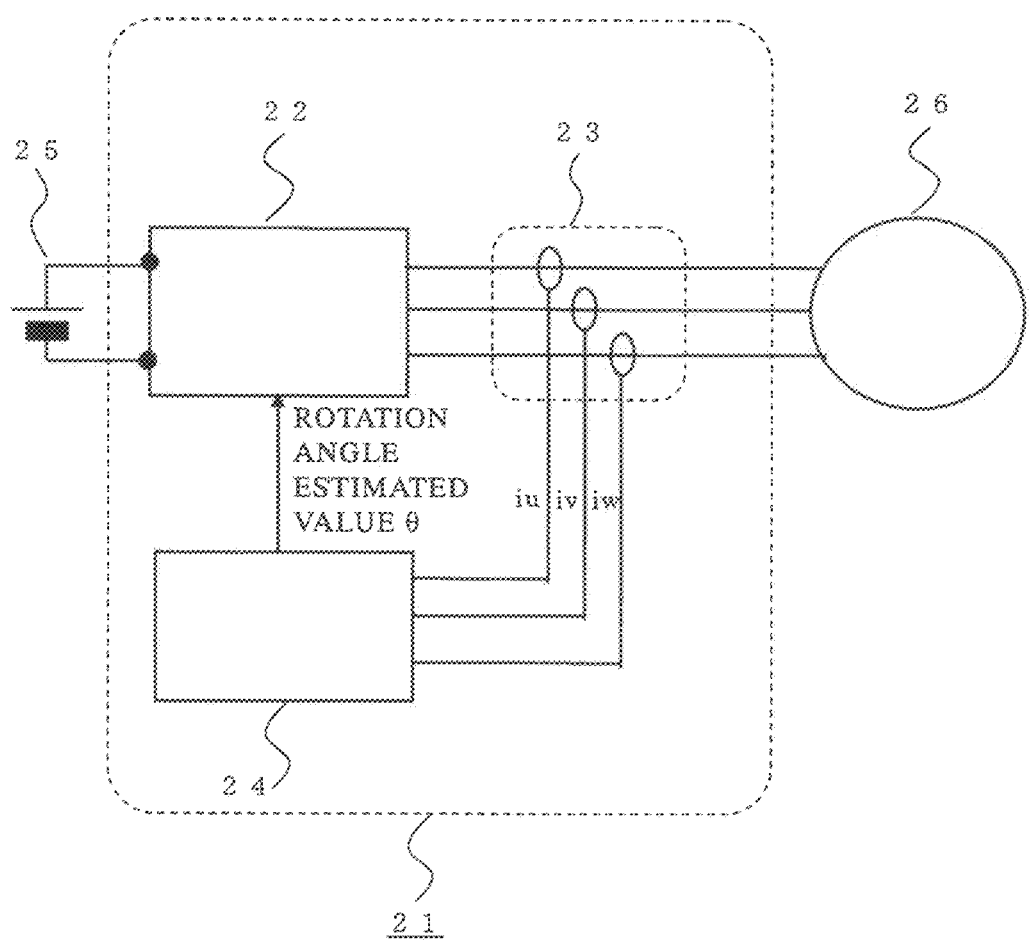
FIG. 17 is a structural diagram of a rotation angle detecting apparatus according to Embodiment 1 of the present invention.

Next, an example of the structure of a rotation angle detecting apparatus for performing the sensorless drive is described. FIG. 17 is a structural diagram of the rotation angle detecting apparatus according to Embodiment 1 of the present invention. The motor 26 is any one of motors described above in Embodiment 1 of the present invention, and the motor 26 is connected to the controller 21. The controller 21 is further connected to a power supply 25. The power supply 25 is constituted of a DC power source such as a battery.

A detailed structure of the controller 21 is omitted in FIG. 17, but the controller 21 includes an inverter 22, an armature current measuring portion 23, and a rotation angle sensing portion 24. The inverter 22 supplies current to the motor 26 so as to drive the motor 26, and a few hundred Hz to a few ten kHz high frequency current, for example, is superimposed on the current to be injected so as to detect the rotation angle.

The armature current measuring portion 23 has a function of measuring the armature current and is constituted of a current sensor using a Hall device or a shunt resistor, for example. The reason why the current sensor using the Hall device or the like is used for the measuring portion is that drive current of the armature current is similar to DC current just after starting to drive the motor, and hence it is necessary to measure current from DC current to AC current of high frequency.

Three-phase current is measured in the structure illustrated in FIG. 17, but it is possible to adopt other structure for measuring two-phase current or one-phase current on the side of the power supply 25. A current value measured by the armature current measuring portion 23 is supplied to the rotation angle sensing portion 24, and a computing process is performed. For instance, the major axis direction of the elliptical locus illustrated in FIGS. 4 and 5 is determined so as to estimate the rotation angle. A rotation angle estimated value θ estimated by the rotation angle sensing portion 24 is utilized for appropriately supplying current for driving the motor in the inverter.

The conventional structure needs a rotation angle detecting apparatus such as a resolver or an encoder that should be additionally provided for driving the motor 26. However, according to the structure of the present invention, the rotation angle can be detected without the resolver, the encoder or the like. Note that the armature current measuring portion 23 is provided to the conventional structure too in which the resolver, the encoder or the like is used for detecting the rotation angle, because it is necessary to detect a current value for controlling torque of the motor.

In addition, the rotation angle sensing portion 24 can be constituted in a microcomputer or an ASIC that is disposed also in the conventional structure. Therefore, according to the present invention, the rotation angle can be detected by a smaller number of components than the conventional structure, and it is possible to realize less expensive and smaller motor drive compared with the conventional structure.

In addition, the motor of the present invention has the electric conductor disposed between the permanent magnets of the rotor, and hence the saliency is large. In addition, in a case where the slot opening width is set to be large, the saliency is larger. The saliency is large, and hence ΔIh becomes large under the condition of the same high frequency current, and accuracy of detecting the rotation angle is increased. Therefore, it is possible to reduce the torque ripple that is caused by low accuracy of detecting the rotation angle.

Note that a waveform and a phase deviation of the high frequency voltage to be applied (a sine wave in the above-mentioned example) are not limited, and a rectangular wave, a triangular wave or the like can be used.

As described above, according to Embodiment 1, the structure in which the value Wsn obtained by dividing the slot opening width Ws by the slot pitch ρs becomes 0.08 or larger is provided, whereby the dependency of the angle error on the load current for the position sensing in the sensorless drive can be reduced. In addition, the saliency necessary for the position sensing can be improved, so as to obtain the permanent magnet type rotary electric machine that is suitable for the sensorless drive.

Embodiment 2

While the shape of increasing the slot opening width Ws is described in Embodiment 1, a shape of increasing the teeth width Wt is described in Embodiment 2.

Figure 18:
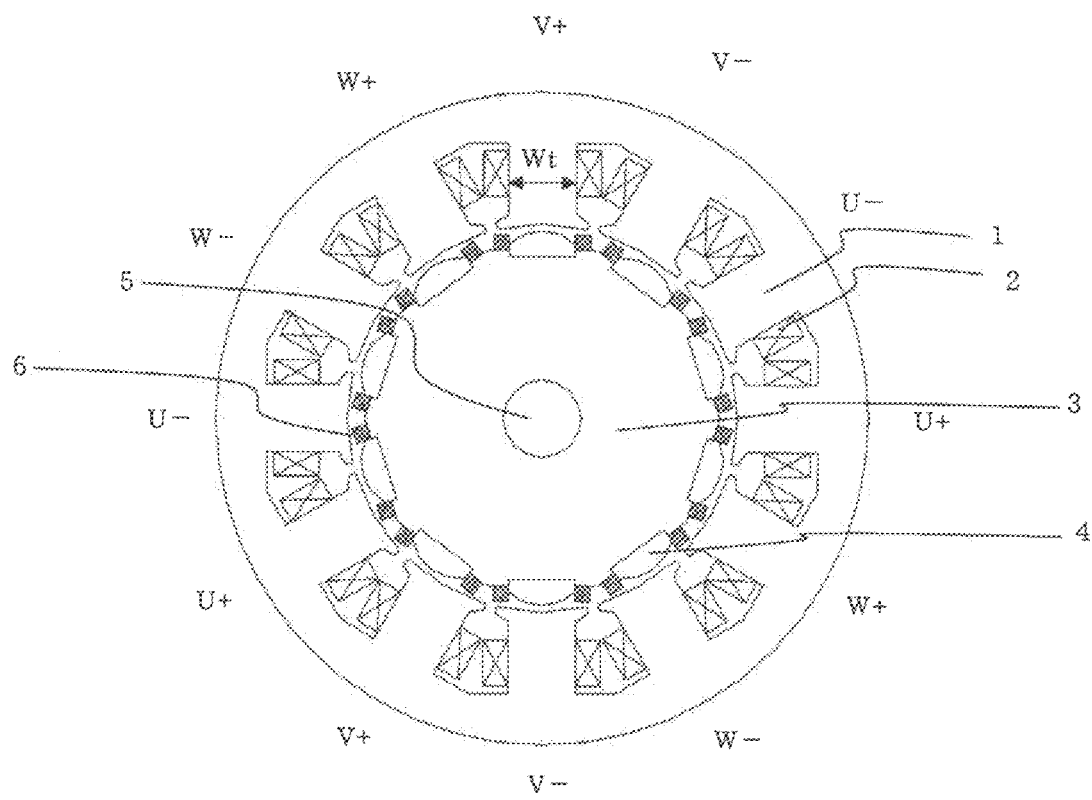
FIG. 18 is a cross section of a motor illustrating a first specific example of a permanent magnet type rotary electric machine according to Embodiment 2 of the present invention.

FIG. 18 is a cross section of a motor illustrating a first specific example of the permanent magnet type rotary electric machine according to Embodiment 2 of the present invention. In Embodiment 2, it is sufficient that the rotor should have the saliency, and the rotor of Embodiment 1 is used in the first specific example. The stator is constituted of the stator core 1 and the armature winding 2, and has the increased teeth width Wt. When the teeth width Wt is increased, the angle error decreases. A graph showing the basis is described as follows.

Figure 19:
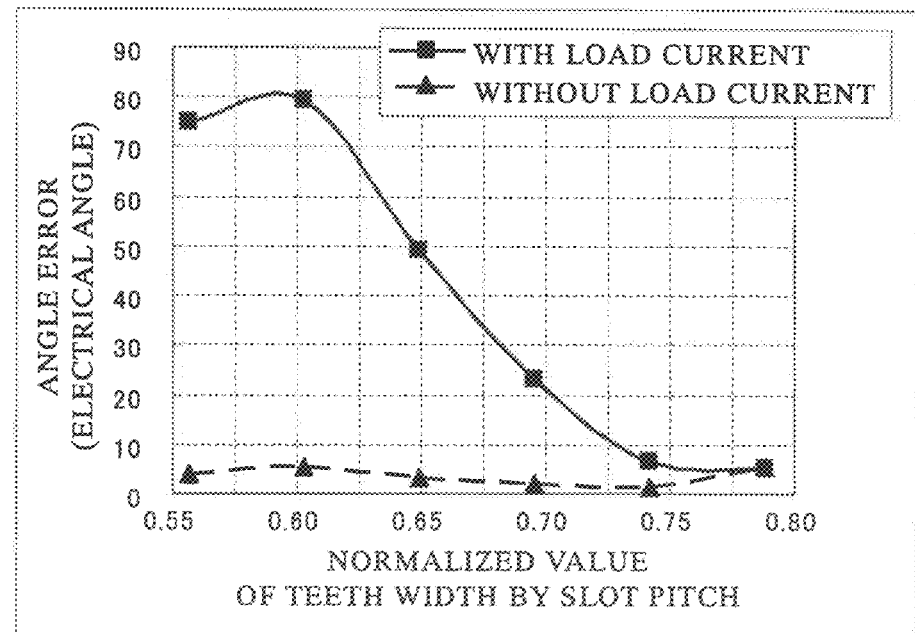
FIG. 19 is a graph illustrating an angle error with a parameter of a teeth width of a motor having 10 poles and 12 slots (with a fixed slot opening width) in Embodiment 2 of the present invention.

FIG. 19 is a graph illustrating the angle error with a parameter of a teeth width of the motor having 10 poles and 12 slots (with a fixed slot opening width) according to Embodiment 2 of the present invention. The horizontal axis represents a value obtained by dividing the teeth width Wt by the slot pitch ρs, and the vertical axis represents the angle error (electrical angle (degrees)).

There are two conditions of the current. One is with the load current, and the other is without the load current. In both conditions, the high frequency current is injected for the sensorless drive. However, in the case with the load current, rating load current is used. As illustrated in FIG. 19, in the case without the load current, the angle error does not depend on the teeth width Wt and is almost zero. On the contrary, in the case with the load current, the angle error depends on the teeth width Wt, and the angle error decreases when the teeth width Wt is increased.

Figure 20:
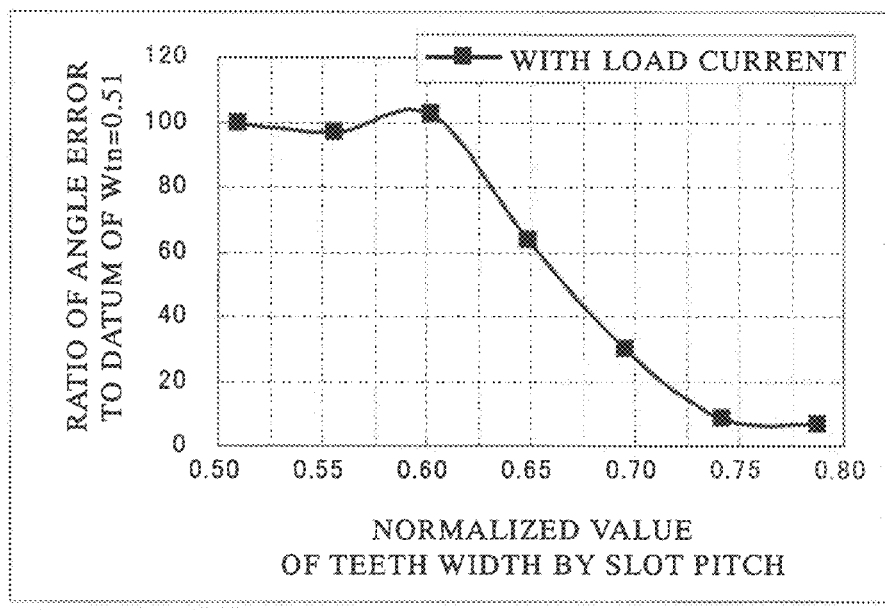
FIG. 20 is a graph illustrating an angle error with a parameter of a teeth width of the motor having 10 poles and 12 slots (with a fixed slot opening width and a datum of the motor having Wtn=0.51) according to Embodiment 2 of the present invention.

FIG. 20 is a graph illustrating the angle error with a parameter of a teeth width of the motor having 10 poles and 12 slots (with a fixed slot opening width and a datum of the motor having Wtn=0.51) according to Embodiment 2 of the present invention. The horizontal axis represents a value Wtn obtained by dividing the teeth width Wt by the slot pitch ρs, and the vertical axis represents a ratio of the angle error (electrical angle (degrees)) of the major axis of the ellipse with respect to the d-axis) with respect to the motor having the value Wtn of 0.51 (the leftmost point in FIG. 20) that is obtained by normalizing the teeth width Wt by the slot pitch ρs.

As illustrated in FIG. 20, the ratio of the angle error with respect to the motor having Wtn of 0.51 can be decreased to be a half or smaller by satisfying "0.67≤Wtn", preferably. More preferably, by satisfying "0.72≤Wtn", the ratio can be decreased to be 1/5 or smaller. In addition, by satisfying "Wtn≤0.92" preferably, a decrease of Wsn can be prevented. Thus, a decrease of the torque or an increase of the torque ripple due to the increase of the angle error can be reduced.

However, "Wtn≤0.92" is satisfied if "0.08≤Wsn" is satisfied. When a lower limit value of Wsn is represented by Wsnmin, Wtn is determined from "1-Wsnmin".

In addition, when the teeth width Wt is increased, permeance of a magnetic circuit connecting the teeth with the permanent magnet increases, and the linkage magnetic flux increases. Thus, the torque increases. In addition, the magnetic saturation in the teeth is relieved, and hence the torque ripple can be reduced.

As described above, according to Embodiment 2, the structure in which the value Wtn obtained by dividing the teeth width Wt by the slot pitch ρs is 0.67 or more is provided, whereby it is possible to reduce dependency of the angle error on the load current for the position sensing in the sensorless drive so as to obtain the permanent magnet type rotary electric machine that is suitable for the sensorless drive.

Further, the structure in which the value Wtn is 0.92 or smaller is provided, whereby it is possible to prevent the value Wsn from being decreased and to reduce a decrease of the torque or an increase of the torque ripple due to an increase of the angle error.

Embodiment 3

Figure 21:
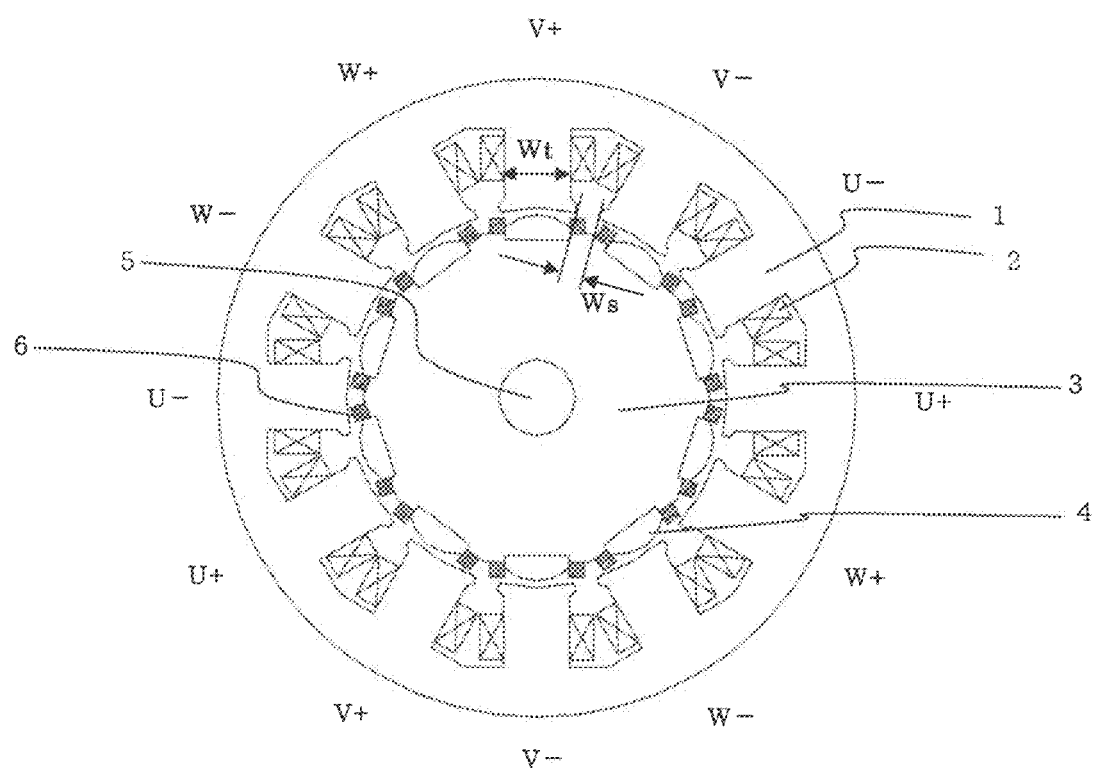
FIG. 21 is a cross section of a motor illustrating a first specific example of a permanent magnet type rotary electric machine according to Embodiment 3 of the present invention.

In Embodiment 3, the stator in which both the slot opening width and the teeth width are increased is described. FIG. 21 is a cross section of a motor illustrating a first specific example of the permanent magnet type rotary electric machine according to Embodiment 3 of the present invention. In Embodiment 3, the rotor is the same as the rotor in Embodiment 1. However, another structure may be adopted as long as the rotor has the saliency.

The stator is constituted of the stator core 1 and the armature winding 2, in which the slot opening width Ws and the teeth width Wt are increased. When the slot opening width Ws and the teeth width Wt are increased, the angle error and the dependency of the angle error on the load current are decreased as described above in Embodiments 1 and 2. Therefore, accuracy of the position sensing by the sensorless drive is enhanced, and hence the problem such as the step out can be reduced.

In addition, the saliency is improved, and hence the high frequency current to be injected for the position sensing can be small, whereby noise can be reduced. In addition, permeance of the magnetic circuit connecting the teeth with the permanent magnet is increased and the linkage magnetic flux is increased, and hence the torque is increased. In addition, the magnetic saturation in the teeth is relieved, and hence the torque ripple can be reduced.

As to a specific effect of decreasing the angle error, similarly to the description in Embodiment 2, in the teeth width Wt, the ratio of the angle error with respect to the motor having the value Wtn of 0.51 that is obtained by normalizing the teeth width Wt with the slot pitch ρs can be decreased to be a half or smaller by satisfying "0.67≤Wtn", preferably. More preferably, by satisfying "0.72≤Wtn", the ratio can be decreased to be 1/5 or smaller.

In addition, similarly to the description in Embodiment 1, in the slot opening width Ws, the ratio of the angle error to the datum of Wsn=0.042 can be reduced to be a half or smaller by satisfying "0.08≤Wsn", preferably. More preferably, by satisfying "0.11≤Wsn", the ratio can be reduced to be 1/5 or smaller.

As described above, according to Embodiment 3, if both the structures of Embodiments 1 and 2 are adopted, the permanent magnet type rotary electric machine having the both effects of Embodiments 1 and 2 can be obtained.

Embodiment 4

Embodiment 4 describes the motor in which the slot opening width Ws and the teeth width Wt of the stator are increased similarly to Embodiment 3, and the arrangement method for the electric conductor of the rotor is different from the first specific example of Embodiment 1.

Figure 22:
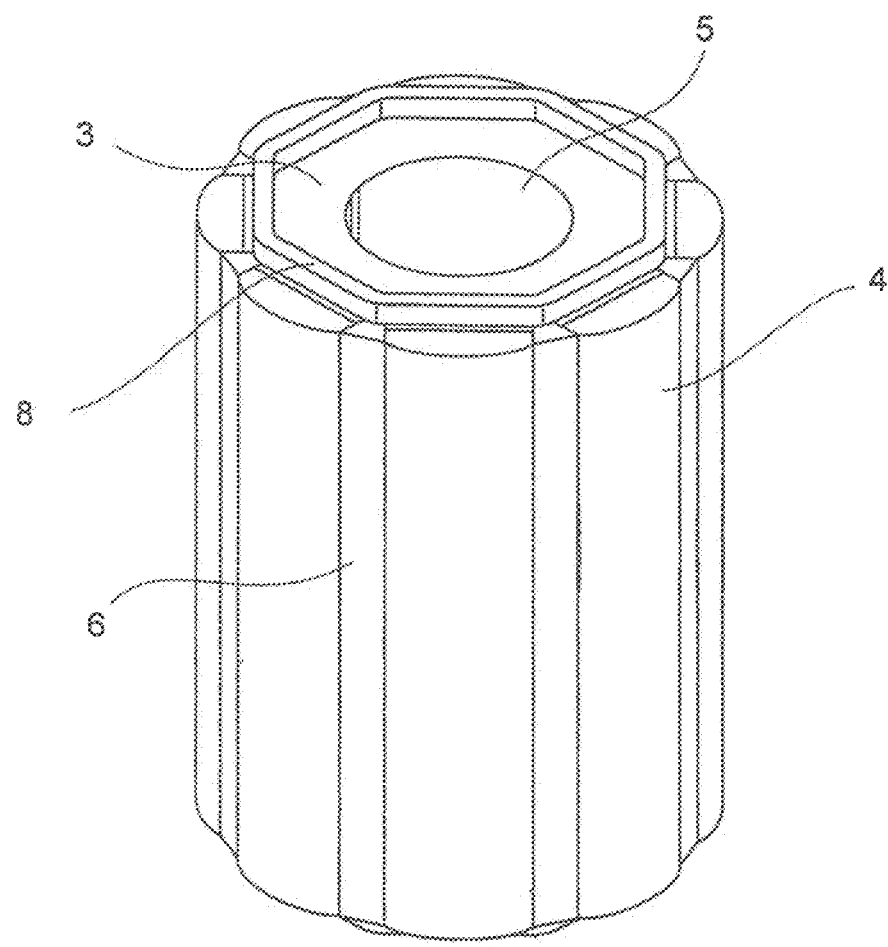
FIG. 22 is a perspective view of a rotor having 8 poles of a first specific example of a permanent magnet type rotary electric machine according to Embodiment 4 of the present invention.
Figure 23:
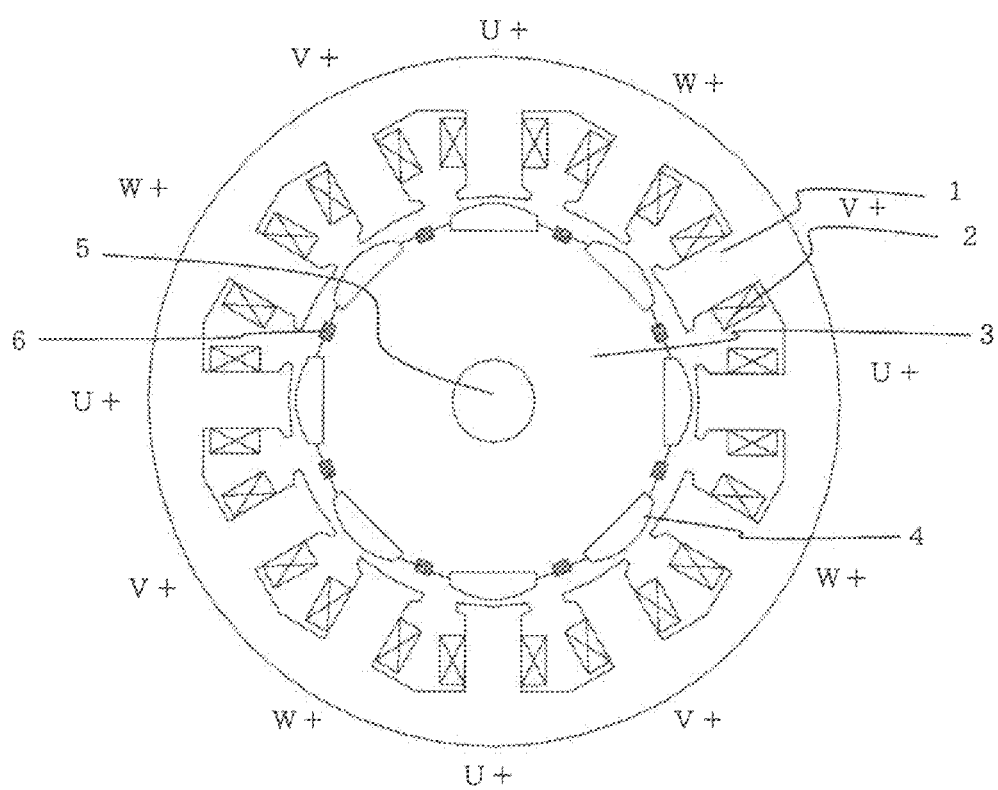
FIG. 23 is a cross section of a motor illustrating a first specific example of a permanent magnet type rotary electric machine according to Embodiment 4 of the present invention.
Figure 24:
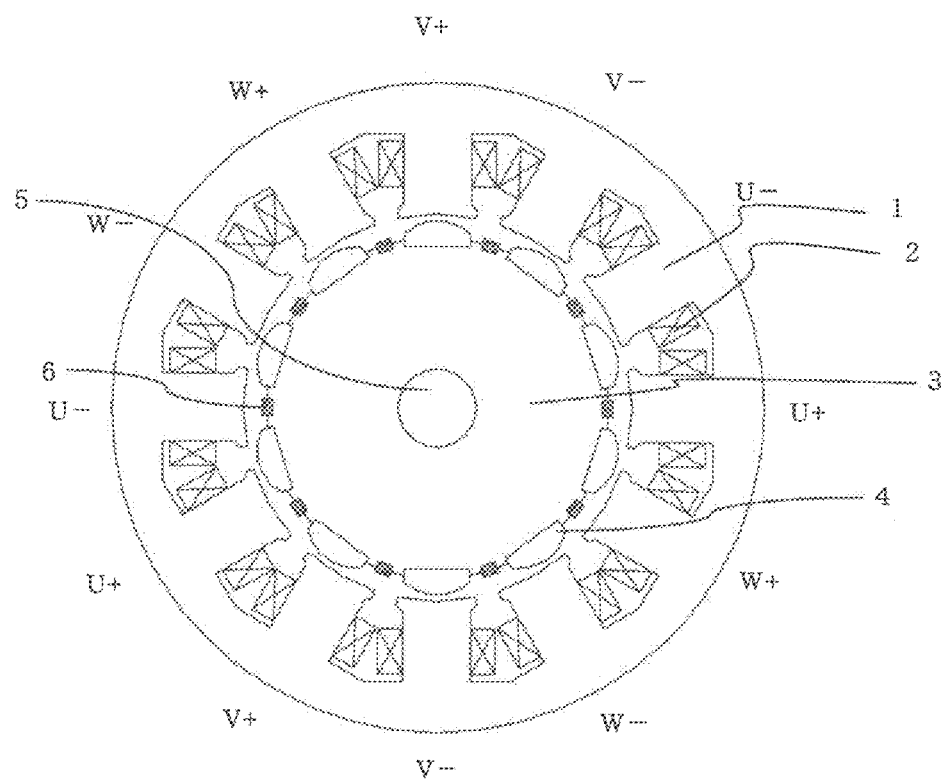
FIG. 24 is a cross section of a motor illustrating a second specific example of the permanent magnet type rotary electric machine according to Embodiment 4 of the present invention.

The above example illustrates a case of the permanent magnet type motor having 10 poles and 12 slots, but this combination of the number of poles and the number of slots should not be interpreted as a limitation. FIG. 22 is a perspective view of the rotor having 8 poles of a first specific example of the permanent magnet type rotary electric machine according to Embodiment 4 of the present invention. As illustrated in FIG. 22, the electric conductor 6 is disposed between the permanent magnets 4, and each end of the electric conductor 6 is electrically connected to the electric conductor 8, whereby the conducting circuit is formed. FIG. 23 is a cross section of a motor illustrating a first specific example of the permanent magnet type rotary electric machine (having 8 poles and 12 slots) according to Embodiment 4 of the present invention. In FIG. 23, supposing that the rotation direction of the rotor is the counter-clockwise direction, a winding arrangement is U+, V+, W+, U+, V+, W+, U+, V+, W+, U+, V+ and W+ in the counter-clockwise direction. Next, FIG. 24 is a cross section of a motor illustrating a second specific example of the permanent magnet type rotary electric machine according to Embodiment 4 of the present invention. The motor of this second specific example has 10 poles and 12 slots.

In the first and second specific example of the permanent magnet type rotary electric machine according to Embodiment 4 of the present invention, these motor have the above structures, so it is possible to obtain substantially the same effect as the above-mentioned effect of the first specific example of Embodiment 3. In other words, the angle error and the dependency of the angle error on the load current are decreased. For this reason, the accuracy of the position sensing by the sensorless drive is enhanced, and the problem such as the step out can be reduced. In addition, the saliency is improved, and hence the high frequency current to be injected for the position sensing can be small, whereby noise can be reduced. In addition, an average torque can be increased, and the torque ripple can be reduced.

As described above, according to Embodiment 4, the same effect as Embodiment 3 can be obtained even with the structure in which the second electric conductor of the rotor has a ring shape so as to constitute the conducting circuit.

Embodiment 5

Embodiment 5 describes the motor in which the slot opening width Ws and the teeth width Wt of the stator are increased similarly to Embodiment 3, and the arrangement method for the electric conductor of the rotor is different from the first specific example of Embodiment 1.

Figure 25:
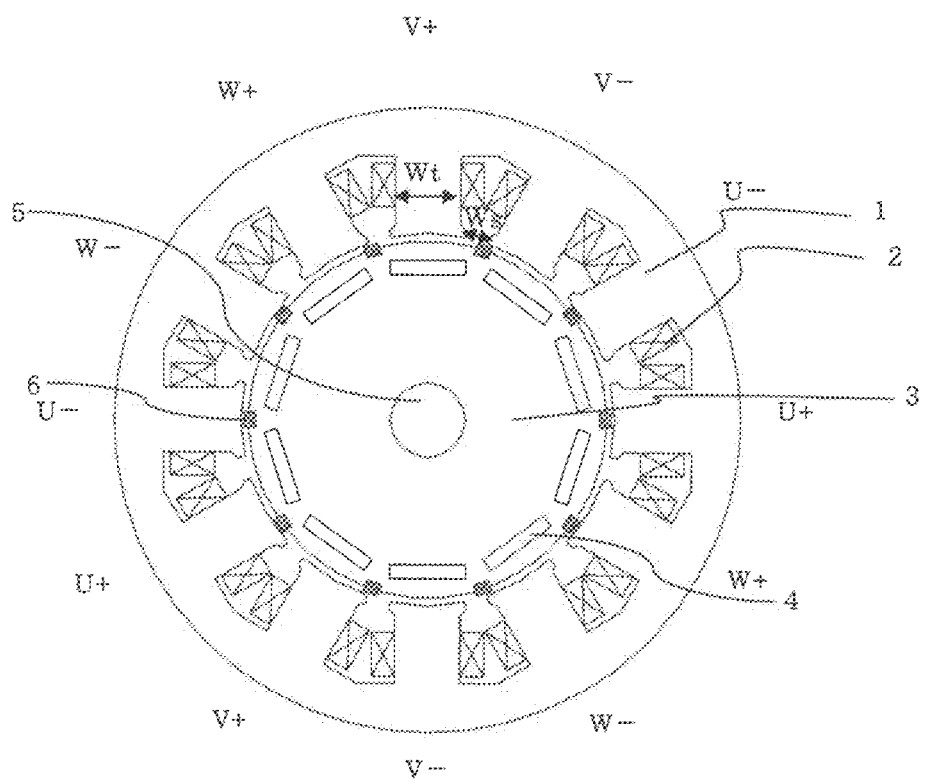
FIG. 25 is a cross section of a motor illustrating a first specific example of a permanent magnet type rotary electric machine according to Embodiment 5 of the present invention.

FIG. 25 is a cross section of a motor illustrating a first specific example of the permanent magnet type rotary electric machine according to Embodiment 5 of the present invention. In FIG. 25, the stator is the same as that illustrated in FIG. 21 of Embodiment 3, and the rotor is an interior permanent magnet in which the electric conductor is disposed at the perimeter of the permanent magnet.

If the rotor is not provided with the electric conductor, the interior permanent magnet usually has larger saliency than the surface permanent magnet has. Therefore, if the electric conductor is provided to the rotors of the interior permanent magnet and the surface permanent magnet, the interior permanent magnet has larger saliency than the surface permanent magnet has. Therefore, according to this structure, accuracy of the position sensing is further improved and noise can be further reduced compared with the case where the rotor is the surface permanent magnet with the electric conductor.

As to the angle error, the same effect as the first specific example of the permanent magnet type rotary electric machine according to Embodiment 3 can be expected. In other words, the angle error and the dependency of the angle error on the load current can be decreased. Therefore, accuracy of the position sensing by the sensorless drive is enhanced, and hence the problem such as the step out can be reduced. In addition, the saliency is improved, and hence the high frequency current to be injected for the position sensing can be small, whereby noise can be reduced. In addition, an average torque can be increased, and the torque ripple can be reduced.

As described above, according to Embodiment 5, the rotor of the interior permanent magnet is used, whereby accuracy of the position sensing can be further improved, and noise can be further reduced. In addition, the same effect as Embodiment 3 can be obtained.

Embodiment 6

Figure 26:
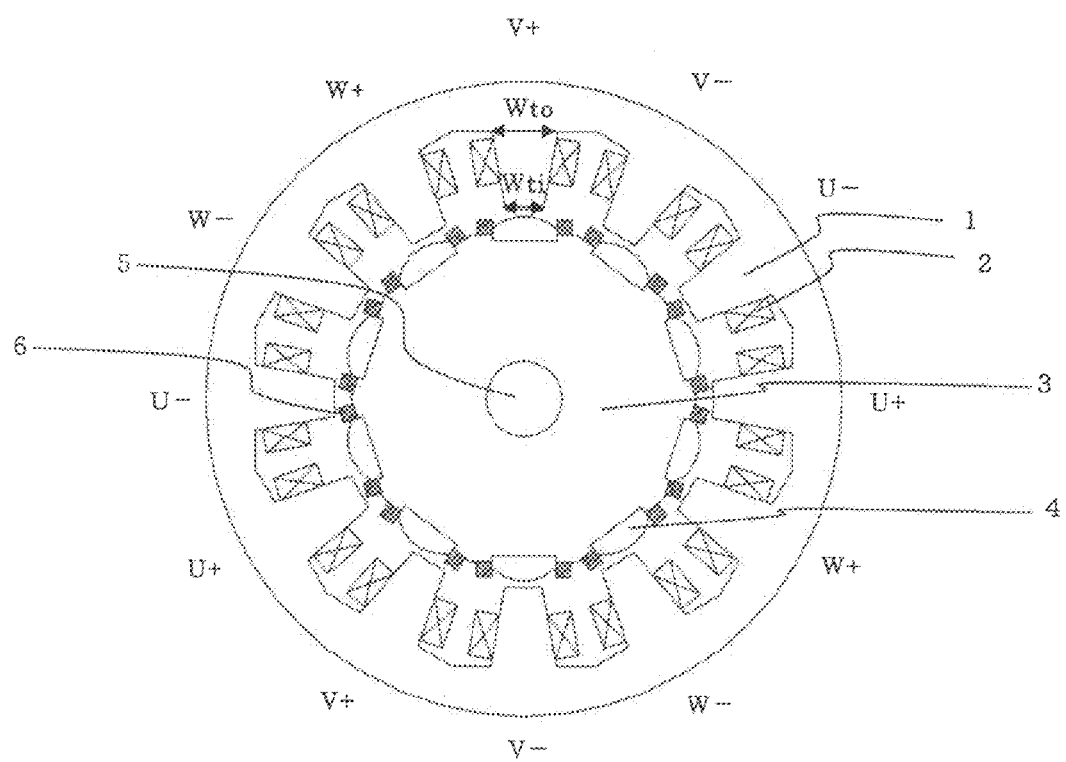
FIG. 26 is a cross section of a motor illustrating a first specific example of a permanent magnet type rotary electric machine according to Embodiment 6 of the present invention.

In Embodiment 6, the structure in which the teeth width Wto at the teeth bottom part is set to be larger than the teeth width Wti at the tip part is described. The rotor is the same as that of Embodiment 1. FIG. 26 is a cross section of a motor illustrating a first specific example of the permanent magnet type rotary electric machine according to Embodiment 6 of the present invention. Usefulness of this structure is described.

The teeth width is usually constant not depending on the radial direction. In other words, side faces of the teeth that are parallel to the axial direction are parallel to each other. However, in the structure in which the teeth width does not depend on the radial direction, there is a limitation for increasing the teeth width Wt and the slot opening width Ws at the same time. Therefore, like Embodiment 6, the structure in which the teeth width Wto at the teeth bottom part is set to be larger than the teeth width Wti at the tip part is adopted, whereby the limitation can be enhanced. Therefore, as to the angle error, the effect that is equal to or higher than the effects of Embodiments 1 and 2 can be expected, which includes the decrease of the angle error and the decrease of dependency of the angle error on the load current, or the like.

Therefore, the accuracy of the position sensing by the sensorless drive is enhanced, and the problem such as the step out can be reduced. In addition, the saliency is improved, and hence the high frequency current to be injected for the position sensing can be small, whereby noise can be reduced. In addition, the average torque can be increased, and the torque ripple can be reduced.

In addition, the width of the teeth bottom part is larger than the width of the teeth neck part in the above-mentioned structure, and hence the magnetic saturation of the teeth bottom part to which the magnetic flux is concentrated is relieved, with the result that the effect of improving the average torque and reducing the torque ripple can be larger at the side faces parallel to the axial direction of the teeth than the case where the side faces are parallel to each other.

As described above, according to Embodiment 6, the teeth width at the teeth bottom part is set to be larger than the teeth width at the tip part, thereby it is possible to obtain the effect that is equal to or higher than the effects of Embodiments 1 and 2.

Embodiment 7

In Embodiment 7, the stator of a semi-slotless motor is described.

Figure 27:
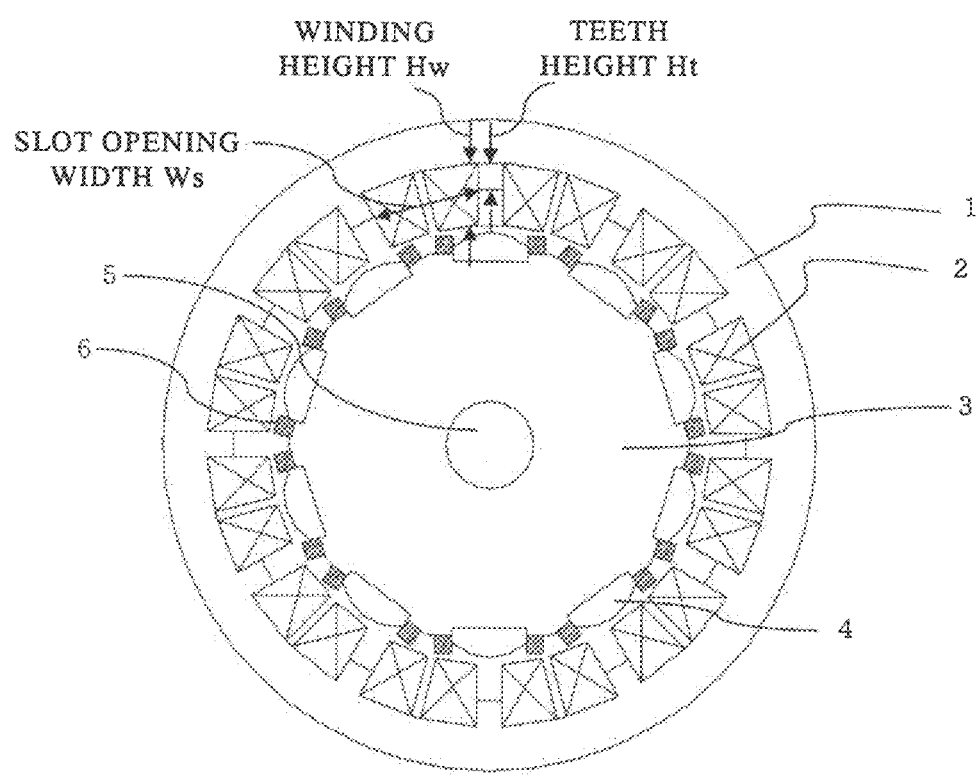
FIG. 27 is a cross section of a motor illustrating a first specific example of a permanent magnet type rotary electric machine according to Embodiment 7 of the present invention.

FIG. 27 is a cross section of a motor illustrating a first specific example of the permanent magnet type rotary electric machine according to Embodiment 7 of the present invention. The rotor illustrated in FIG. 27 is the same as the rotor of Embodiment 1, but other structure may be adopted as long as the rotor has the saliency. On the other hand, the stator is constituted of the stator core 1 and the armature winding 2. As illustrated in FIG. 27, the teeth height Ht is set to be lower than an ordinary motor that is not the semi-slotless type. The teeth height Ht has a value within a range expressed by the following equation using a winding height Hw.

$$0 \leq Ht \leq Hw/2$$

In other words, the teeth height Ht is a half of the winding height Hw or lower, and can be any lower value as long as the motor is not the slotless type (without teeth). This structure means that the slot opening width Ws is increased, and hence the leakage magnetic flux between neighboring teeth is small, and it is possible to obtain substantially the same effect as the third specific example of the permanent magnet type rotary electric machine according to Embodiment 1. In other words, the angle error and the dependency of the angle error on the load current are reduced. Therefore, the accuracy of the position sensing by the sensorless drive is enhanced, and the problem such as the step out can be reduced.

In addition, the saliency is improved, and hence the high frequency current to be injected for the position sensing can be small, whereby the noise can be reduced. In addition, the average torque can be increased, and the torque ripple can be reduced. In addition, like the motor that does not have the semi-slotless structure, the teeth is used not only for increasing permeance of the magnetic circuit between the armature winding and the permanent magnet but also for positioning of the winding.

As described above, according to Embodiment 7, it is possible to obtain the same effect as Embodiment 1 also in the case where the stator of the semi-slotless motor is used.

Embodiment 8

In Embodiments 1 to 7, the stator structure of the motor that is suitable for the sensorless drive has been described. In contrast, Embodiment 8 describes a motor in which the stator of Embodiments 1 and 3 to 7 is combined with the stator having a small slot opening width Ws in the axial direction.

In Embodiment 1, the stator is constituted of the stator core 1 and the armature winding 2, and the slot opening width Ws is increased. According to this structure, the effect described above in Embodiment 1 can be obtained as for the angle error. However, with this structure only, because the slot opening width Ws is increased, the cogging torque becomes larger than the case of other motor having a small slot opening width Ws.

Figure 28:
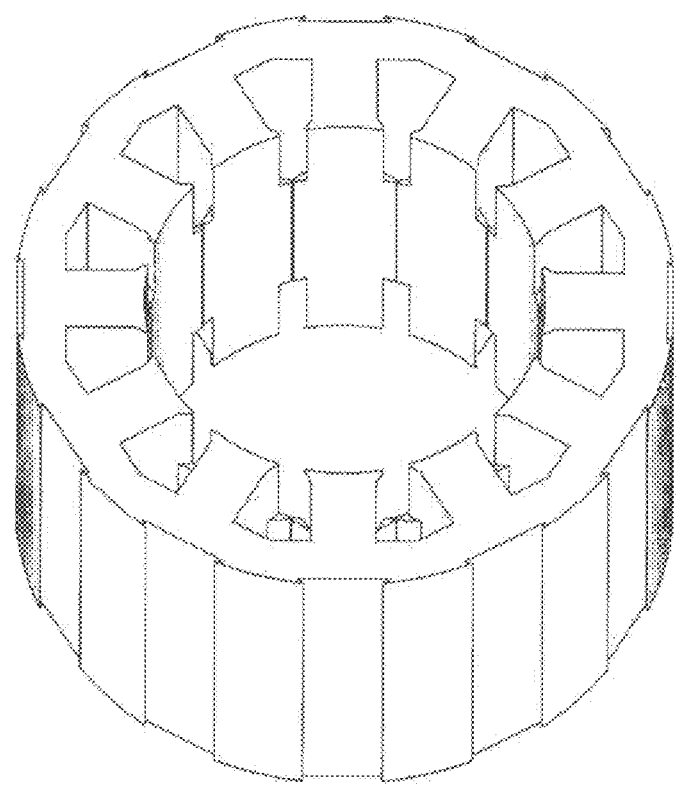
FIG. 28 is a perspective view of a motor illustrating a first specific example of a permanent magnet type rotary electric machine according to Embodiment 8 of the present invention.

FIG. 28 is a perspective view of a motor illustrating a first specific example of a permanent magnet type rotary electric machine according to Embodiment 8 of the present invention. As illustrated in FIG. 28, the first specific example of Embodiment 8 has a structure in which the stator having a small slot opening width Ws is sandwiched between the stators having the increased slot opening width Ws described above in Embodiment 1 in the axial direction.

Figure 29:
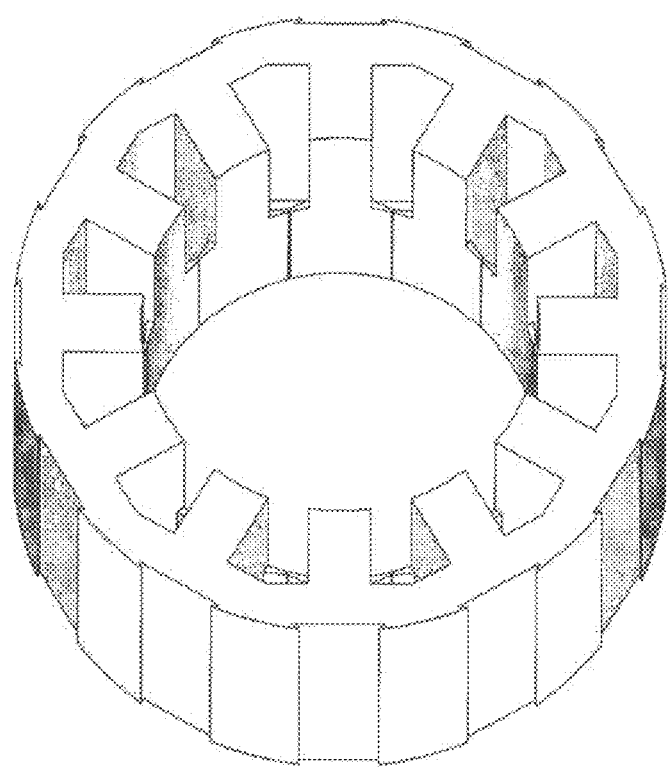
FIG. 29 is a perspective view of a motor illustrating a second specific example of the permanent magnet type rotary electric machine according to Embodiment 8 of the present invention.

In addition, FIG. 29 is a perspective view of a motor illustrating a second specific example of the permanent magnet type rotary electric machine according to Embodiment 8 of the present invention. As illustrated in FIG. 29, in the order from the upper side on the paper, a tip part of the teeth is eliminated, and the stator having a larger slot opening width Ws than the case with the tip part described above in Embodiment 2 and the stator having a small slot opening width Ws are aligned in the axial direction.

In the stator having a small slot opening width Ws, the cogging torque is small because the slot opening width Ws is not large. Therefore, with the structure illustrated in FIGS. 28 and 29, substantially the same effect as the stator described above in Embodiment 1 can be obtained, and in addition the cogging torque can be reduced compared with the stator described above in Embodiment 1.

In Embodiments 3 to 5, the stator is constituted of the stator core 1 and the armature winding 2, and the slot opening width as well as the teeth width is increased. According to this structure, the effect as described above in Embodiments 3 to 5 can be obtained as for the angle error. However, with this structure only, because the slot opening width Ws is increased, the cogging torque becomes larger than the case of the motor having a small slot opening width Ws.

Figure 30:
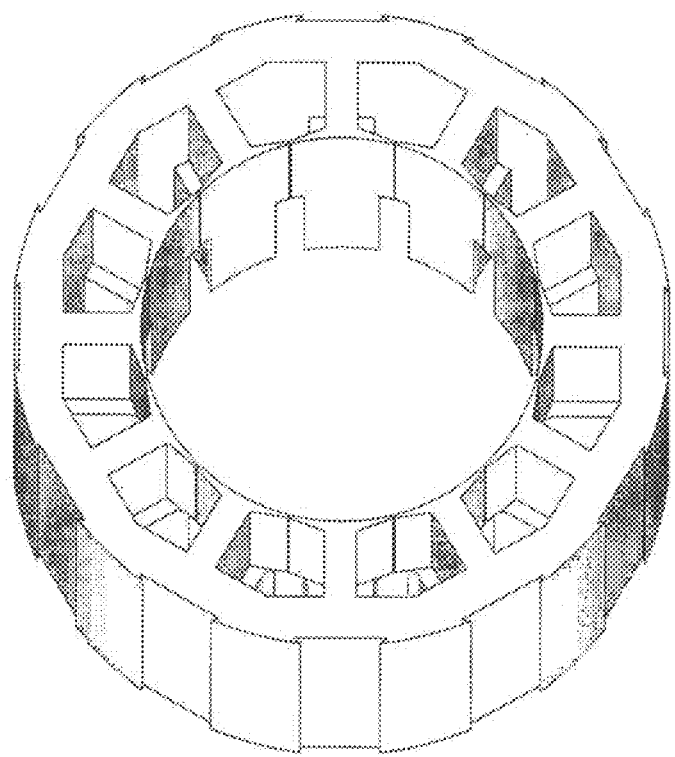
FIG. 30 is a perspective view of a motor illustrating a third specific example of the permanent magnet type rotary electric machine according to Embodiment 8 of the present invention.

FIG. 30 is a perspective view of a motor illustrating a third specific example of the permanent magnet type rotary electric machine according to Embodiment 8 of the present invention. As illustrated in FIG. 30, the third specific example has the structure in which the stator having a small slot opening width Ws and the stator having the increased slot opening width Ws and the increased teeth width Wt described above in Embodiments 3 to 5 are aligned in the axial direction in the order from the upper side on the paper.

In the stator having a small slot opening width Ws, the cogging torque is small because the slot opening width is not large. Therefore, with this structure, substantially the same effect as the stator described above in Embodiments 3 to 5 can be obtained, and in addition the cogging torque can be reduced compared with the stator described above in Embodiments 3 to 5.

In Embodiment 6, the stator has the structure in which the teeth width at the teeth bottom part is set to be larger than the teeth width at the neck part. According to this structure, the effect described above in Embodiment 6 can be obtained as for the angle error. However, with this structure only, because the slot opening width Ws is increased, the cogging torque becomes larger than the case of other motor having a small slot opening width.

Figure 31:
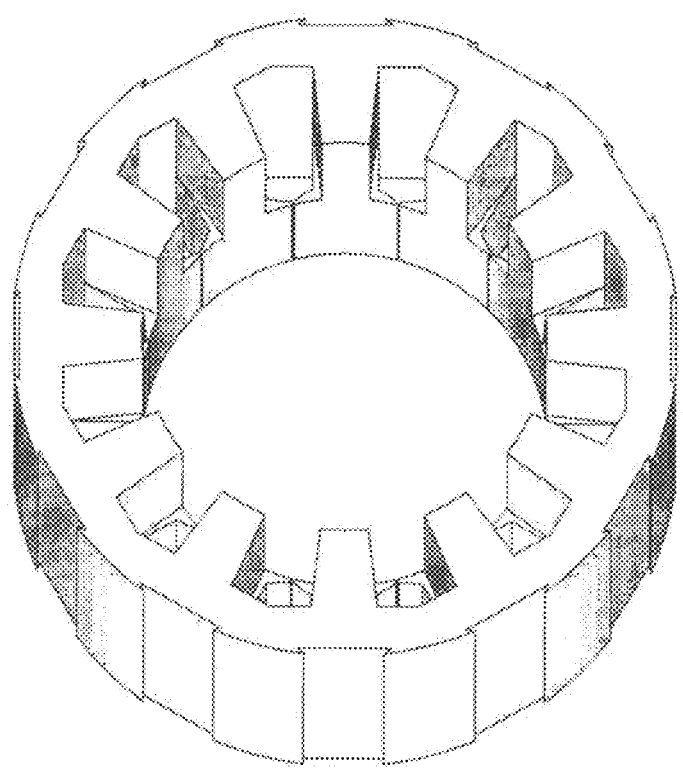
FIG. 31 is a perspective view of a motor illustrating a fourth specific example of the permanent magnet type rotary electric machine according to Embodiment 8 of the present invention.

FIG. 31 is a perspective view of a motor illustrating a fourth specific example of the permanent magnet type rotary electric machine according to Embodiment 8 of the present invention. As illustrated in FIG. 31, the fourth specific example has the structure in which the stator having the teeth width at the teeth bottom part that is larger than the teeth width at the neck part described above in Embodiment 6 and the stator having the small slot opening width Ws are aligned in the axial direction in the order from the upper side on the paper.

The stator having the small slot opening width Ws has a small cogging torque because the slot opening width is not large. Therefore, with this structure, substantially the same effect as the stator described above in Embodiment 6 can be obtained, and in addition the cogging torque can be reduced compared with the stator described above in Embodiment 6.

In Embodiment 7, the stator of the semi-slotless motor has been described. However, with this stator only, the slot opening width Ws is large, and hence the cogging torque is increased compared with the motor having a small slot opening width. Although not illustrated, the stator described above in Embodiment 7 may be combined with the stator having a small slot opening width Ws in the axial direction, and accordingly substantially the same effect of the stator described above in Embodiment 7 can be obtained, and in addition the cogging torque can be reduced compared with the stator described above in Embodiment 7.

As described above, according to Embodiment 8, the stator having the small slot opening width is combined in the axial direction so as to constitute the motor, whereby the cogging torque is reduced, and the same effect as Embodiments 1 and 3 to 7 can be obtained.

Embodiment 8 describes the motor in which the stator of each embodiment is combined with the stator having the small slot opening width Ws in the axial direction. However, the arrangement of the stators is not limited to the specific examples described above, and the stators may be arranged in an alternating manner, for example.

In addition, in Embodiments 1 to 8 described above, an example of the case in which the armature winding is a concentrated winding has been described. Moreover, Embodiments 10 and 11 that are described later also show an example of the case in which the armature winding is a concentrated winding. These Embodiments illustrate specific examples of the motor having 10 poles and 12 slots or 8 poles and 12 slots, but this combination of the number of poles and the number of slots should not be interpreted as a limitation. For example, even when the ratio of the number of poles to the number of slots in a motor is as described below, it is possible for the motor to have a constitution similar to Embodiments 1 to 8, 10 and 11.

the number of poles:the number of slots=$12n\pm2n$:$12n$
(n is an integer equal to and larger than 1)
the number of poles:the number of slots=$9n\pm n$:$9n$
(n is an integer equal to and larger than 1)
the number of poles:the number of slots=$3n\pm n$:$3n$
(n is an integer equal to and larger than 1)

Embodiment 9

In Embodiments 1 to 8, an example of the case in which the armature winding is a concentrated winding has been described. In addition, Embodiments 10 and 11 that are described later also show an example of the case in which the armature winding is a concentrated winding. In contrast, Embodiment 9 describes the case in which the armature winding is a distributed winding.

In Embodiment 9, the armature winding 2 is wound over a plurality of teeth of the stator core. Embodiment 9 is similar to Embodiments 1 to 8, 11 and 12 except for the number of poles, the number of slots, and the winding method.

Figure 32:
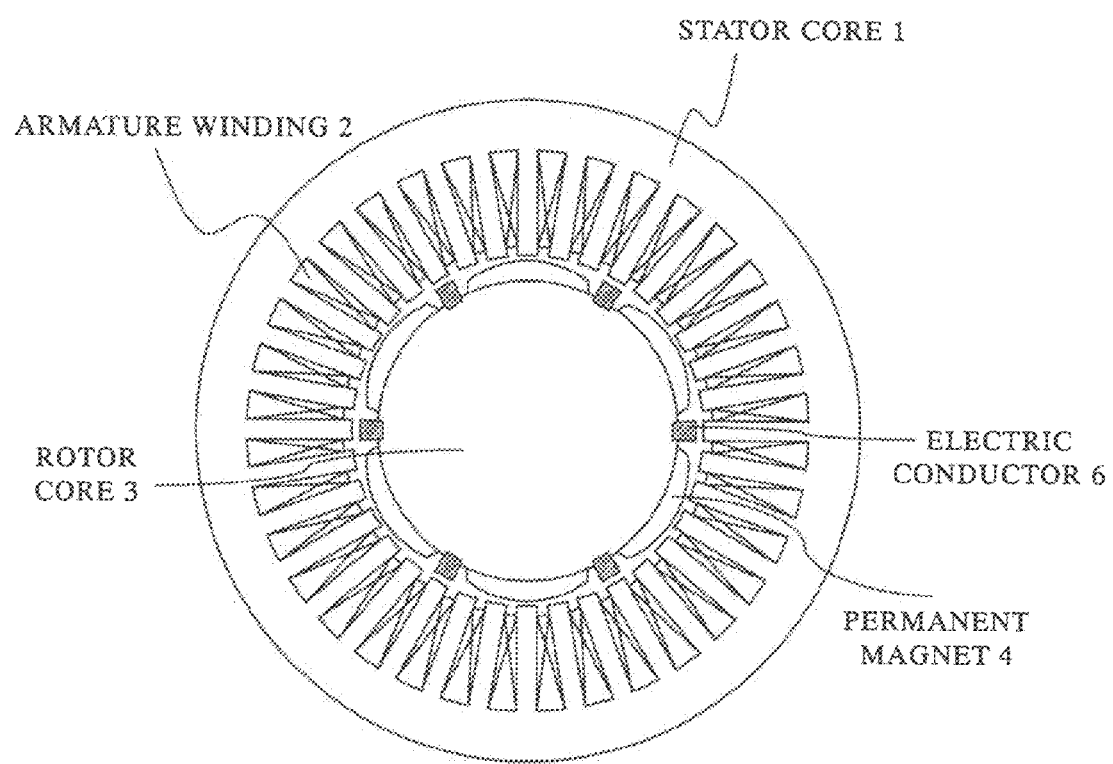
FIG. 32 is a cross section of a motor illustrating the first specific example of the permanent magnet type rotary electric machine according to Embodiment 8 of the present invention.

FIG. 32 is a cross section of a motor illustrating a first specific example of a permanent magnet type rotary electric machine according to Embodiment 9 of the present invention. This example illustrates a case of the motor having 6 poles and 36 slots, but this combination of the number of poles and the number of slots should not be interpreted as a limitation.

The ratio of the number of poles and the number of slots may be m:6m (m is an integer equal to and larger than 1), or the ratio of the number of poles and the number of slots may be m:3m (m is an integer equal to and larger than 1) (for example, 4 poles and 12 slots, 6 poles and 18 slots, or the like). Otherwise, the ratio of the number of poles and the number of slots may be 2m:9m (m is an integer equal to and larger than 1) (for example, 4 poles and 18 slots, 6 poles and 27 slots, or the like).

In Embodiment 9, only the number of poles, the number of slots, and the winding method are changed from those of Embodiments 1 to 8 described above and Embodiments 10 and 11 that are described later, and other structure is the same. Therefore, the same effect as each embodiment can be obtained. In addition, the winding is the distributed winding, and hence a waveform of a magnetomotive force generated in the armature winding 2 is close to a sine wave, whereby the effect of reducing the torque ripple in comparison to the concentrated winding can be obtained.

As described above, according to Embodiment 9, the same effect can be obtained even in the case where the armature winding is the distributed winding, and the effect of reducing the torque ripple can be obtained.

Embodiment 10

Figure 33:
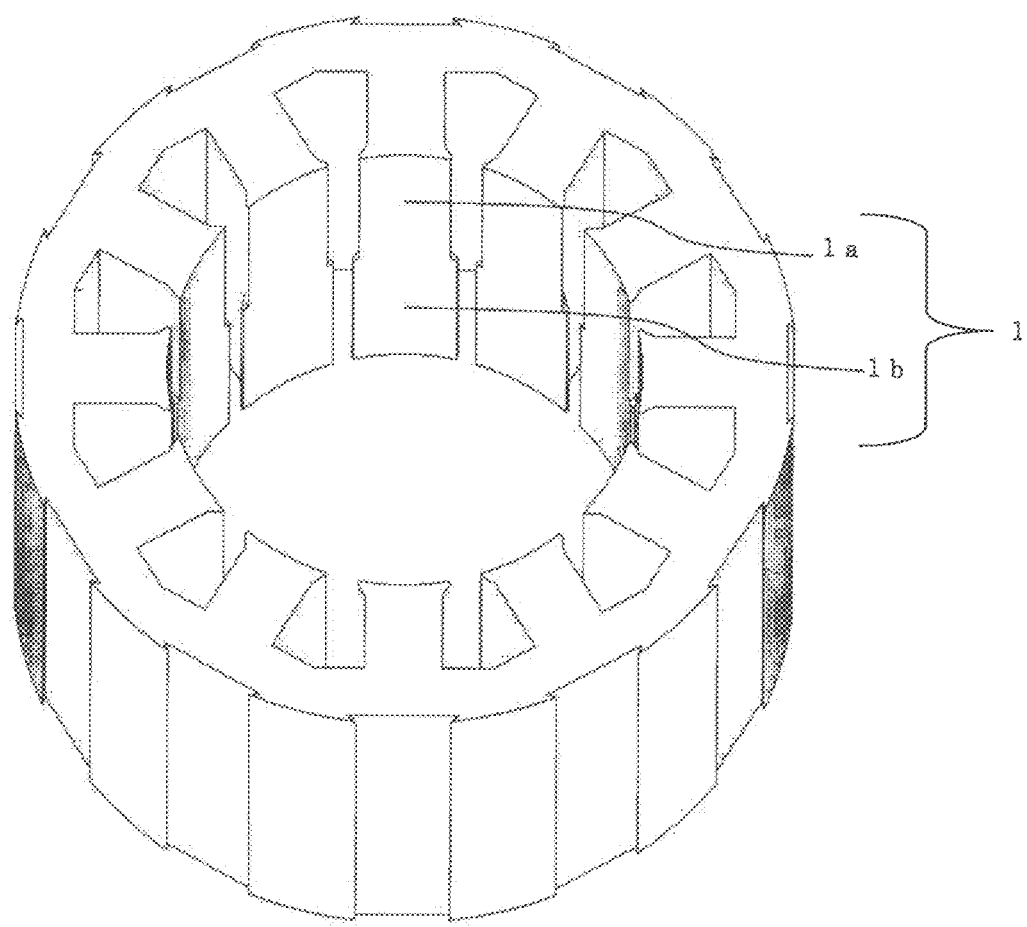
FIG. 33 is a perspective view of a motor illustrating a first specific example of a permanent magnet type rotary electric machine according to Embodiment 10 of the present invention (only a stator core is illustrated)
Figure 34:
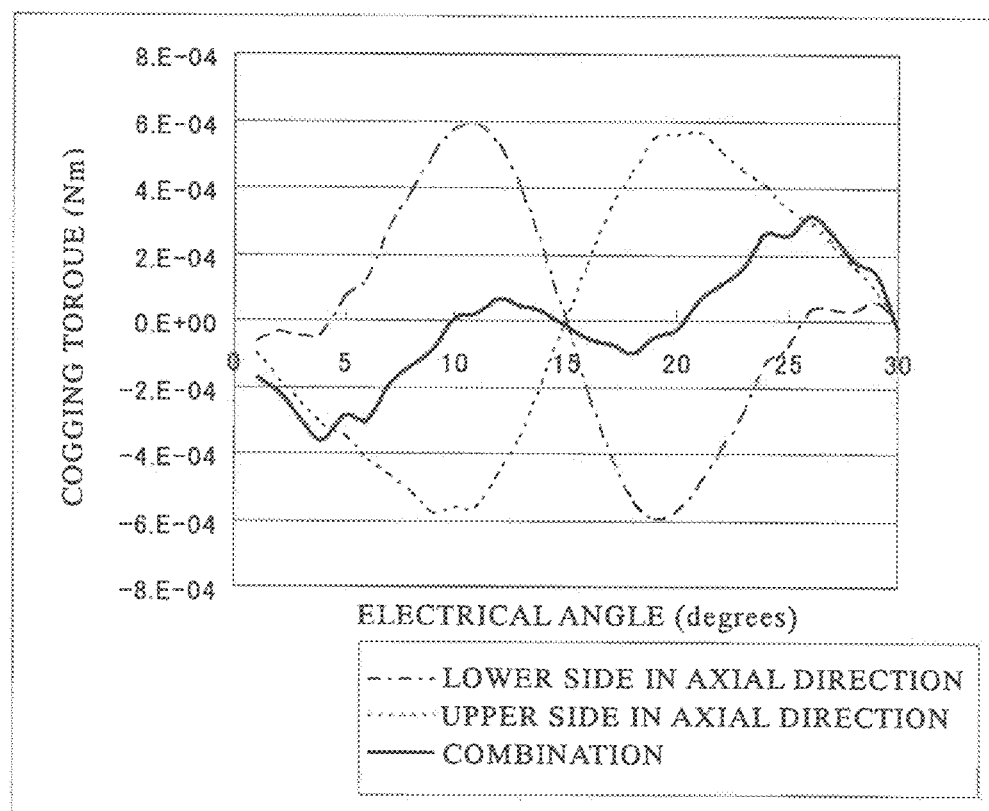
FIG. 34 is a graph illustrating cogging torque waveforms of the motor illustrated in FIG. 33 of Embodiment 10 of the present invention.

Embodiment 10 describes the case in which both the slot opening width Ws and the teeth width Wt of the stator have values within the range described above in Embodiment 3, and the stators having different slot opening widths Ws (the stator on the upper side 1a in the axial direction of the stator core and the stator on the lower side 1b in the axial direction of the stator core) are combined in the axial direction. FIG. 33 is a perspective view of a motor illustrating a first specific example of a permanent magnet type rotary electric machine according to Embodiment 10 of the present invention (only the stator core is illustrated). In addition, FIG. 34 is a graph illustrating cogging torque waveforms of the motor illustrated in FIG. 33 of Embodiment 10.

Here, the rotor is of a surface permanent magnet having the electric conductor disposed at the perimeter of the permanent magnet 4, in which the stator core 1 is provided with the armature winding 2 as a matter of course. FIG. 34 illustrates three cogging torques including, viewed from the above of the paper of FIG. 33, the cogging torque on the lower side 1b in the axial direction of the stator core 1, the cogging torque on the upper side 1a in the axial direction of the stator core 1, and the cogging torque of the stator core 1 (sum of the cogging torques on both sides 1a and 1b) (which are respectively referred to as LOWER SIDE IN AXIAL DIRECTION, UPPER SIDE IN AXIAL DIRECTION, and COMBINATION in the legend).

The cogging torque of the stator core 1 is smaller than a peak-to-peak value of the cogging torque on the upper side 1a in the axial direction only or the cogging torque on the lower side 1b in the axial direction only, because the cogging torques on both sides are cancelled with each other. In this way, when the stators having different slot opening widths Ws are combined in the axial direction, the cogging torque can be reduced.

In addition, when the slot opening width Ws is increased, the angle error and the dependency of the angle error on the load current can be decreased. Therefore, the accuracy of the position sensing by the sensorless drive is enhanced, whereby the problem such as the step out can be reduced. In addition, the saliency is improved, and hence the high frequency current to be injected for the position sensing can be small, and the noise can be reduced. In addition, average torque can be increased, and the torque ripple can be reduced.

In FIG. 33, the different stators are combined to form a two stage structure, and the both have the same length in the axial direction. However, the stators may be combined alternatingly to form a three or more stage structure. In addition, lengths in the axial direction of individual stages may not be the same. Even if amplitudes of the cogging torques are different, the effect of reducing the cogging torque can be increased by adjusting the lengths in the axial direction of individual stages.

The rotor of the motor illustrated in FIG. 33 is of the surface permanent magnet having the electric conductor disposed at the perimeter of the permanent magnet 4, but may be of the interior permanent magnet having the electric conductor disposed at the perimeter of the permanent magnet 4.

As described above, according to Embodiment 10, different stators are combined so that the effect of reducing the cogging torque is increased, whereby the same effect as Embodiments 1 to 9 can be obtained.

Embodiment 11

Figure 35:
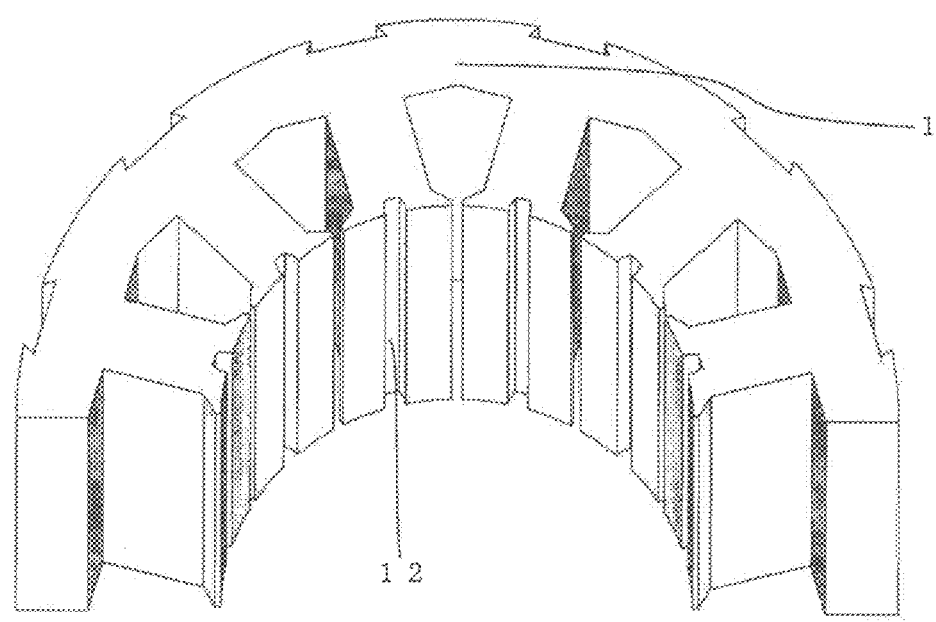
FIG. 35 is a perspective view of a motor illustrating a first specific example of a permanent magnet type rotary electric machine according to Embodiment 11 of the present invention.

Embodiment 11 describes the stator having dummy slots 12 formed in the teeth so that the slot opening width Ws and the teeth width Wt are increased. FIG. 35 is a perspective view of a motor illustrating a first specific example of a permanent magnet type rotary electric machine according to Embodiment 11 of the present invention. As illustrated in FIG. 35, the dummy slots 12 are formed in the teeth. Thus, the cogging torque can be reduced.

In addition, the slot opening width Ws is increased, and hence the angle error and the dependency of the angle error on the load current are reduced. Therefore, the accuracy of the position sensing by the sensorless drive is enhanced so that the problem such as the step out can be reduced. In addition, the saliency is improved, and hence the high frequency current to be injected for the position sensing can be small so that the noise can be reduced. In addition, the average torque can be increased, and the torque ripple can be reduced.

As described above, according to Embodiment 11, the dummy slots are formed in the teeth, whereby the effect of reducing the cogging torque can be obtained, and in addition the same effect as Embodiments 1 to 9 can be obtained.

Note that the rotor may be any one of the surface permanent magnet and the interior permanent magnet as long as the electric conductor is disposed at the perimeter of the permanent magnet.

Embodiment 12

Figure 36:
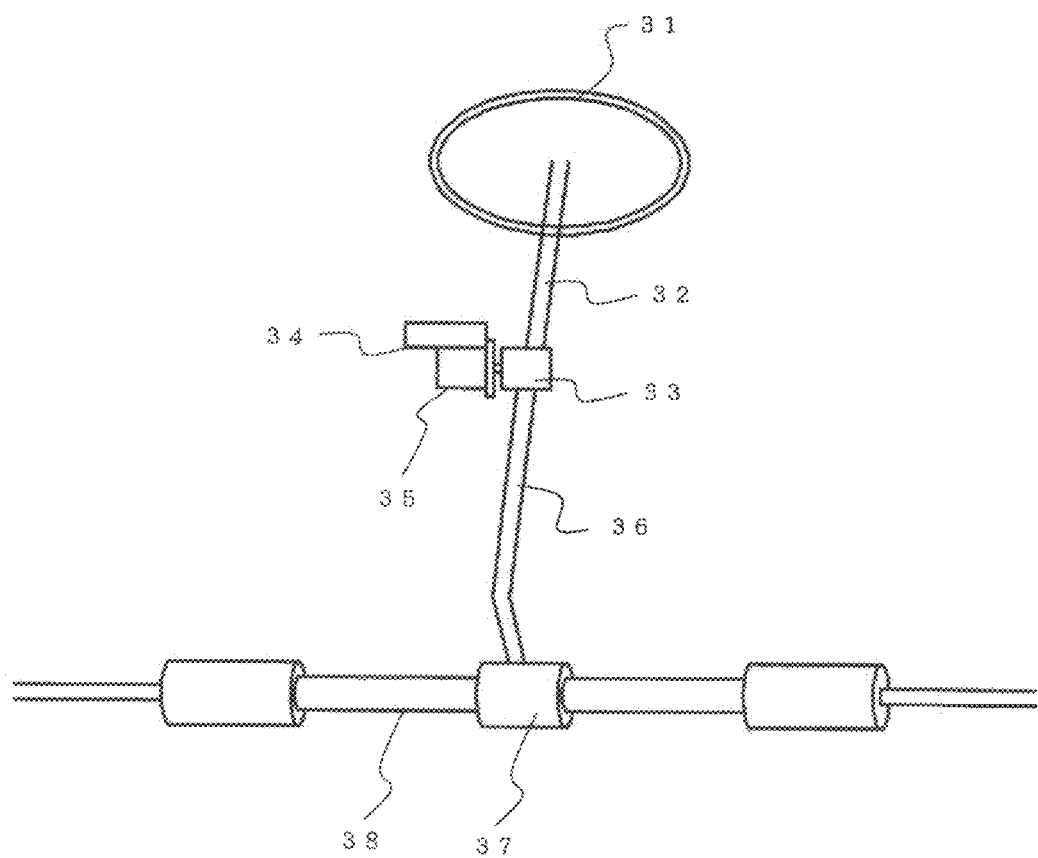
FIG. 36 is a schematic diagram illustrating a structure of an electric power steering apparatus according to Embodiment 12 of the present invention.

Embodiment 12 describes a specific example of applying the rotation position sensing of the present invention to an electric power steering apparatus. FIG. 36 is a schematic diagram illustrating a structure of an electric power steering apparatus according to Embodiment 12 of the present invention.

There is provided a column shaft 32 that is connected to a steering wheel 31 and receives a steering force from the steering wheel 31. In addition, the column shaft 32 is connected to a worm gear 33 (in FIG. 36, detailed illustration is omitted, and only a gear box is illustrated), whereby the steering force is transmitted to the worm gear 33.

The worm gear 33 transmits an output (which depends on the torque or the velocity of rotation) of a motor 35 driven by a controller 34 while changing the rotation direction thereof to the perpendicular direction and reducing the rotation speed, so as to add an assist torque of the motor 35 to the steering force. The steering force is transmitted to a steering joint 36 that is connected to the worm gear 33, whereby the direction thereof is also changed.

A steering gear 37 reduces the rotation speed of the steering joint 36 and simultaneously converts the rotation motion into a linear motion of a rack 38, so as to obtain a required displacement. This linear motion of the rack 38 drives wheels, whereby a direction change of a vehicle or the like can be performed.

In such an electric power steering apparatus as described above, it is necessary to detect the rotation angle in order to drive the motor 35 appropriately. Therefore, the conventional motor has a rotation angle detecting apparatus such as a Hall sensor or a resolver. However, if the Hall sensor or the resolver is used, the number of components is increased and cost thereof is also increased. In addition, a physical shape of the motor becomes larger as well because of the rotation angle detecting apparatus.

Therefore, in order to solve this problem, the motor 35 of any one of Embodiments 1 to 11 of the present invention can be incorporated in the electric power steering apparatus. Thus, without the rotation angle detecting apparatus, the rotation angle can be detected by measuring the armature current utilizing a difference in impedance generated by the induced current flowing in the electric conductor.

Using the controller 34, high frequency voltage of a few hundred Hz to a few ten kHz, for example, is applied to the motor so as to superimpose the high frequency voltage on the voltage for driving the motor 35, and the high frequency current generated by the motor 35 is measured, whereby the rotation angle can be detected. In other words, the rotation sensorless drive can be performed.

As a result, hence the number of components can be reduced and cost thereof can also be reduced. Further, it is possible to obtain the effect of reducing a physical shape of the motor 35 and a weight thereof. In addition, the electric power steering apparatus having high reliability can be obtained.

In such an electric power steering apparatus as described above, the cogging torque and the torque ripple generated in the motor 35 are transmitted to the steering wheel 31 through the worm gear 33 and the column shaft 32. Therefore, if the motor 35 generates a large cogging torque or a large torque ripple, smooth steering feeling cannot be obtained.

However, if the motor of the present invention is adopted as the motor 35, the rotation angle can be detected without the Hall sensor or the resolver even if the motor is of the surface permanent magnet. The surface permanent magnet is usually apt to have smaller cogging torque and torque ripple than the interior permanent magnet having a large saliency. Conventionally, rotation sensorless drive can be performed for the interior permanent magnet having a large saliency. However, if the motor of the present invention is used as the motor 35, the rotation sensorless drive can be performed also for the surface permanent magnet.

As described above, according to Embodiment 12, the rotation position sensing unit using the permanent magnet type rotary electric machine of the present invention is used for the electric power steering apparatus. Thus, even for the surface permanent magnet, it is possible to obtain the effect of reducing the number of components, reducing cost thereof, and reducing the motor size and weight, and in addition the effect of "low cogging torque and low torque ripple" can be obtained.

Further, the accuracy of the position sensing is high, it is possible to reduce the torque ripple that is caused by low accuracy of the position sensing. In addition, as described above in Embodiment 1, the effect of reducing noise can also be obtained. In the column type in which the motor is disposed in a cabin, reduction of noise is required because the motor is disposed to be close to a driver. If the present invention is adopted, accuracy of the position sensing can be secured even if amplitude of the high frequency current is small. Therefore, the effect of reducing noise can be obtained.

What is claimed is:

1. A permanent magnet type rotary electric machine, comprising:
   a rotor including a rotor core and a plurality of permanent magnets;
   one or more conducting circuits each including:
      a first electric conductor extending in an axial direction of the rotor and being disposed between at least two permanent magnets in a circumferential direction of the rotor; and
      a second electric conductor for connecting the first electric conductors electrically,
      the one or more conducting circuits being disposed at one or more positions in the circumferential direction of the rotor;
   a stator disposed so as to be opposed to the rotor, the stator including a stator core and an armature winding; and
   an inverter superimposing a high frequency voltage on the armature winding,
   the permanent magnet type rotary electric machine detecting a rotation angle by measuring a difference in the armature current resulting from changing induced current flowing in the conducting circuits depending on the high frequency voltage and a position of the rotor,
   wherein the stator core is formed so as to have a shape in which, when a slot pitch ρs (mm) is defined by $\rho s = (2 \times \pi \times Rs)/Ns$, where an inner radius of the stator is represented by Rs (mm) and a number of slots is represented by Ns,
   a value Wsn obtained by dividing a slot opening width Ws (mm) by the slot pitch ρs (i.e., Wsn=Ws/ρs) satisfies the following equation:

$0.08 \leq Wsn \leq 0.35$; and a value Wtn obtained by dividing a tooth width Wt (mm), measured at a center portion of a shaft of each of the teeth, by the slot pitch ρs (i.e., Wtn=Wt/ρs) satisfies the following equation:

$0.67 \leq Wtn \leq 0.92$.

2. The permanent magnet type rotary electric machine according to claim 1, wherein the stator core is formed so as to have a shape in which tip parts of teeth are eliminated.

3. The permanent magnet type rotary electric machine according to claim 1, wherein the stator core is formed so as to have a shape in which a teeth width at a teeth bottom part is larger than a teeth width at a teeth neck part.

4. The permanent magnet type rotary electric machine according to claim 1, wherein the stator core is formed so as to have a shape in which, when a teeth height is represented by Ht (mm), and a winding height is represented by Hw (mm), the following equation is satisfied:

$Ht \leq Hw/2$.

5. The permanent magnet type rotary electric machine according to claim 1, wherein the stator core is combined with another stator core in the axial direction, the another stator core being formed so as to have a shape that satisfies at least one of the following three equations:

$Wsn \leq 0.08$;

$Wtn \leq 0.92$; and $Wtn \leq 0.67$.

6. The permanent magnet type rotary electric machine according to claim 1, wherein the stator core is combined with another stator core in the axial direction, the another stator core being formed so as to have a shape that satisfies at least one of the following two equations:

$Wsn \geq 0.08$; and $0.67 \leq Wtn \leq 0.92$, and further the another stator core having a different shape from the shape of the stator core in terms of one of the value Wsn and the value Wtn.

7. The permanent magnet type rotary electric machine according to claim 1, wherein the stator core is formed so as to have a shape in which a dummy slot is formed in teeth.

* * * * *

UNITED STATES PATENT AND TRADEMARK OFFICE
CERTIFICATE OF CORRECTION

PATENT NO. : 9,013,083 B2  
APPLICATION NO. : 12/778424  
DATED : April 21, 2015  
INVENTOR(S) : Yusuke Morita et al.

Page 1 of 1

It is certified that error appears in the above-identified patent and that said Letters Patent is hereby corrected as shown below:

In the Specification

Column 15, line 23, change "$0\leq Ht \leq Hw/2$" to --$0 < Ht \leq Hw/2$--.

In the Claims

Claim 5, column 22, line 24, change "$Wtn \leq 0.92$; and" to --$Wtn \geq 0.92$; and--.

Signed and Sealed this  
Tenth Day of November, 2015

Michelle K. Lee  
*Director of the United States Patent and Trademark Office*